United States Patent
Chakraborty

(10) Patent No.: US 11,567,783 B2
(45) Date of Patent: Jan. 31, 2023

(54) DATA FORMAT TRANSFORMATION FOR DOWNSTREAM PROCESSING IN A DATA PIPELINE

(71) Applicant: Rockwell Automation Technologies, Inc., Mayfield Heights, OH (US)

(72) Inventor: Soumendu Chakraborty, San Jose, CA (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 0 days.

(21) Appl. No.: 17/365,335

(22) Filed: Jul. 1, 2021

(65) Prior Publication Data

US 2022/0308897 A1    Sep. 29, 2022

Related U.S. Application Data

(60) Provisional application No. 63/164,786, filed on Mar. 23, 2021.

(51) Int. Cl.
*G06F 9/44* (2018.01)
*G06F 9/445* (2018.01)

(52) U.S. Cl.
CPC ................. *G06F 9/44505* (2013.01)

(58) Field of Classification Search
CPC ..................... G06F 1/32; G06F 9/44
See application file for complete search history.

(56) References Cited

U.S. PATENT DOCUMENTS

| 8,856,212 B1 * | 10/2014 | Jia ........................ G06F 9/54 |
| | | 709/203 |
| 11,182,697 B1 | 11/2021 | Murakonda et al. |
| 2001/0055018 A1 * | 12/2001 | Yaginuma ............ G06F 16/26 |
| | | 345/440 |
| 2010/0077260 A1 | 3/2010 | Pillai et al. |
| 2013/0317803 A1 | 11/2013 | Manley et al. |

(Continued)

OTHER PUBLICATIONS

Non-Final Office Action received for U.S. Appl. No. 17/365,425 dated Feb. 17, 2022, 70 pages.

(Continued)

*Primary Examiner* — Keshab R Pandey
(74) *Attorney, Agent, or Firm* — Amin, Turocy & Watson, LLP

(57) ABSTRACT

A data pipeline configuration system allows industrial data pipelines to be configured using an intuitive visual interface. The pipeline configuration system allows graphical pipeline components representing data sources, data processing, analytic or machine learning models, and emitters to be selectively added to an industrial data pipeline application by selecting these components from a library. The pipeline configuration application is created by arranging and linking these selected pipeline components within a pipeline builder section of the configuration system's visual design interface. The design interface also allows analytic or machine learning models to be easily integrated into the pipeline application and mapped to incoming data items, such that the model is applied and scored against incoming data during pipeline operation. The configuration system also allows the user to configure destinations or data sinks for the pipeline data, including both the incoming industrial data and model scoring results.

20 Claims, 23 Drawing Sheets

(56) References Cited

U.S. PATENT DOCUMENTS

| | | |
|---|---|---|
| 2014/0229846 A1 | 8/2014 | Abaya et al. |
| 2014/0344310 A1 | 11/2014 | Seetharaman et al. |
| 2015/0106075 A1 | 4/2015 | Boys et al. |
| 2016/0098037 A1 | 4/2016 | Zornio et al. |
| 2016/0321308 A1 | 11/2016 | Brinnand |
| 2017/0269921 A1* | 9/2017 | Martin Vicente ......... G06F 8/61 |
| 2019/0377817 A1 | 12/2019 | McCluskey et al. |
| 2019/0384577 A1 | 12/2019 | Seif et al. |
| 2020/0081916 A1 | 3/2020 | Mcshane et al. |
| 2020/0250477 A1 | 8/2020 | Barthur |
| 2020/0379609 A1 | 12/2020 | Jacob et al. |
| 2021/0034581 A1 | 2/2021 | Boven et al. |
| 2021/0132600 A1 | 5/2021 | Bhattiprolu |
| 2021/0150310 A1 | 5/2021 | Wu et al. |
| 2021/0173736 A1* | 6/2021 | Duesterwald ....... G06F 11/0793 |
| 2021/0271802 A1 | 9/2021 | Kramer |

OTHER PUBLICATIONS

"Solution Overview", DFML_TWX Integration, retrieved on Mar. 22, 2021, 1 page.

Final Office Action received for U.S. Appl. No. 17/365,425 dated Jul. 22, 2022, 83 pages.

Non-Final Office Action received for U.S. Appl. No. 17/365,373 dated Sep. 8, 2022, 56 pages.

\* cited by examiner

Scoring Processor - Configure

◉ Model Selection ⟶ ● Field Mapping ⟶ ● Configuration ⟶ ● Notes

Model Name : vibration_model

| Model Field | Type | Input Message Field | Input Field Type |
|---|---|---|---|
| low_grease | BOOLEAN | Low_grease ⌄ | BOOLEAN |
| S1_fb2 | DOUBLE | Low_grease ⌄ | BOOLEAN — Data Types must match |
| S1_fb3 | DOUBLE | s1_fb1 ⌄ | DOUBLE INTEGER |
| S1_fb4 | DOUBLE | S1_fb3 ⌄ | BOOLEAN |
| S1_fb5 | DOUBLE | Please select* ⌄ | |

FIG. 10

Scoring Processor — 100 of 100 records with 16 of 16 columns

Current Schema: AnalyticsSync

| PredictiveScores | ErrorMesage | FieldName1 | FieldWeight1 | FieldName2 | FieldWeight2 | low_grease | S1_fo2 | S1_f03 | S1 |
|---|---|---|---|---|---|---|---|---|---|
| ("s1_fb1":"95.92923,"s1_fb1_mo":"0.2727512) | null | S2_fb1 | 0.42119266011 | s1_fb4 | 0.201269782903 | false | 195.473936378 | 191.78817781 | 102. |
| ("s1_fb1":"94.87343,"s1_fb1_mo":"0.267248) | null | S2_fb1 | 0.3890040111912 | s1_fb4 | 0.182205651057 | false | 194.531569918 | 193.78277778 | 104. |
| ("s1_fb1":"93.01057,"s1_fb1_mo":"0.2575381) | null | S2_fb1 | 0.426855859963 | s1_fb4 | 0.192965550903 | false | 195.683382002 | 197.96201972 | 100. |
| ("s1_fb1":"89.07446,"s1_fb1_mo":"0.20702179) | null | S2_fb1 | 0.412821056763 | s1_fb4 | 0.169722822877 | false | 191.533395654 | 190.09611239 | 99.4 |
| ("s1_fb1":"87.3744,"s1_fb1_mo":"0.22816044) | null | S2_fb1 | 0.457064622555 | s1_fb4 | 0.124850638951 | false | 193.199817919 | 190.48710043 | 91.9 |
| ("s1_fb1":"199.10144,"s1_fb1_mo":"0.8105205) | null | S2_fb1 | 0.719390868655 | s1_fb4 | 0.106667743087 | false | 207.213178936 | 87.908320099 | 204. |
| ("s1_fb1":"199.02546,"s1_fb1_mo":"0.81012464) | null | S2_fb1 | 0.783576658466 | s1_fb4 | 0.101592547502 | false | 201.411408399 | 148.75930028 | 200. |
| ("s1_fb1":"197.53911,"s1_fb1_mo":"0.8023771) | null | S2_fb1 | 0.793932086661 | s1_fb4 | 0.0905094577053 | false | 200.047291801 | 186.12125369 | 204.8 |

DATA FORMAT TRANSFORMATION FOR DOWNSTREAM PROCESSING IN A DATA PIPELINE

CROSS-REFERENCE TO RELATED APPLICATIONS

This application claims priority to U.S. Provisional Patent Application Ser. No. 63/164,786, filed on Mar. 23, 2021, and entitled "INDUSTRIAL DATA PIPELINE CONFIGURATION SYSTEM," the entirety of which is incorporated herein by reference.

BACKGROUND

The subject matter disclosed herein relates generally to industrial data processing and transformation, and, for example, to the configuration of data pipelines

BRIEF DESCRIPTION

The following presents a simplified summary in order to provide a basic understanding of some aspects described herein. This summary is not an extensive overview nor is it intended to identify key/critical elements or to delineate the scope of the various aspects described herein. Its sole purpose is to present some concepts in a simplified form as a prelude to the more detailed description that is presented later.

In one or more embodiments, a system is provided, comprising a user interface component configured to render an interface display and to receive, via interaction with the interface display, pipeline configuration input that defines aspects of an industrial data pipeline; and a pipeline configuration component configured to generate a pipeline application based on the pipeline configuration input, the pipeline application configured to execute on a hardware platform to implement the industrial data pipeline, wherein the pipeline configuration input comprises at least data preparation selection input that selects a data preparation component, from a library of pipeline components, for inclusion in the pipeline application, and inclusion of the data preparation component in the pipeline application configures the industrial data pipeline to perform data preparation processing specified by the data preparation component on input data obtained by the industrial data pipeline from a data source.

Also, one or more embodiments provide a method, comprising rendering, by a system comprising a processor, an interface display on a client device, wherein the rendering comprises rendering icons representing pipeline components available for inclusion in an industrial data pipeline application; receiving, by the system via interaction with the interface display, pipeline configuration input that defines aspects of an industrial data pipeline, wherein the receiving comprises receiving at least data preparation selection input that selects a data preparation component, of the pipeline components, for inclusion in the industrial data pipeline application; and generating, by the system, the industrial data pipeline application in accordance with the pipeline configuration input, wherein the generating comprises, in response to the receiving of the data preparation selection input, configuring the industrial data pipeline application to perform data preparation processing specified by the data preparation component on input data obtained by the industrial data pipeline, and the industrial data pipeline application is configured to execute on a hardware device to implement the industrial data pipeline.

Also, according to one or more embodiments, a non-transitory computer-readable medium is provided having stored thereon instructions that, in response to execution, cause a system comprising a processor to perform operations, the operations comprising rendering, an interface display on a client device, wherein the rendering comprises displaying component icons representing pipeline components available for inclusion in an industrial data pipeline application; receiving, via interaction with the interface display, pipeline configuration input that defines aspects of an industrial data pipeline, wherein the receiving comprises receiving at least data preparation selection input that selects a data preparation component, of the pipeline components, for inclusion in the industrial data pipeline application; and generating the industrial data pipeline application based on the pipeline configuration input, wherein the generating comprises, in response to the receiving of the data preparation selection input, configuring the industrial data pipeline application to perform data preparation processing specified by the data preparation component on input data obtained by the industrial data pipeline, and the industrial data pipeline application is configured to execute on a hardware platform to implement the industrial data pipeline.

To the accomplishment of the foregoing and related ends, certain illustrative aspects are described herein in connection with the following description and the annexed drawings. These aspects are indicative of various ways which can be practiced, all of which are intended to be covered herein. Other advantages and novel features may become apparent from the following detailed description when considered in conjunction with the drawings.

BRIEF DESCRIPTION OF THE DRAWINGS

FIG. 10 is an example field mapping interface display that can be generated by a pipeline configuration system and used to perform model field mapping.

FIG. 16 is an example machine learning (ML) model scoring display that can be rendered by a pipeline configuration system and used to render prediction and scoring results and other information relating to application of an analytic model to incoming pipeline data.

DETAILED DESCRIPTION

Figure 1:
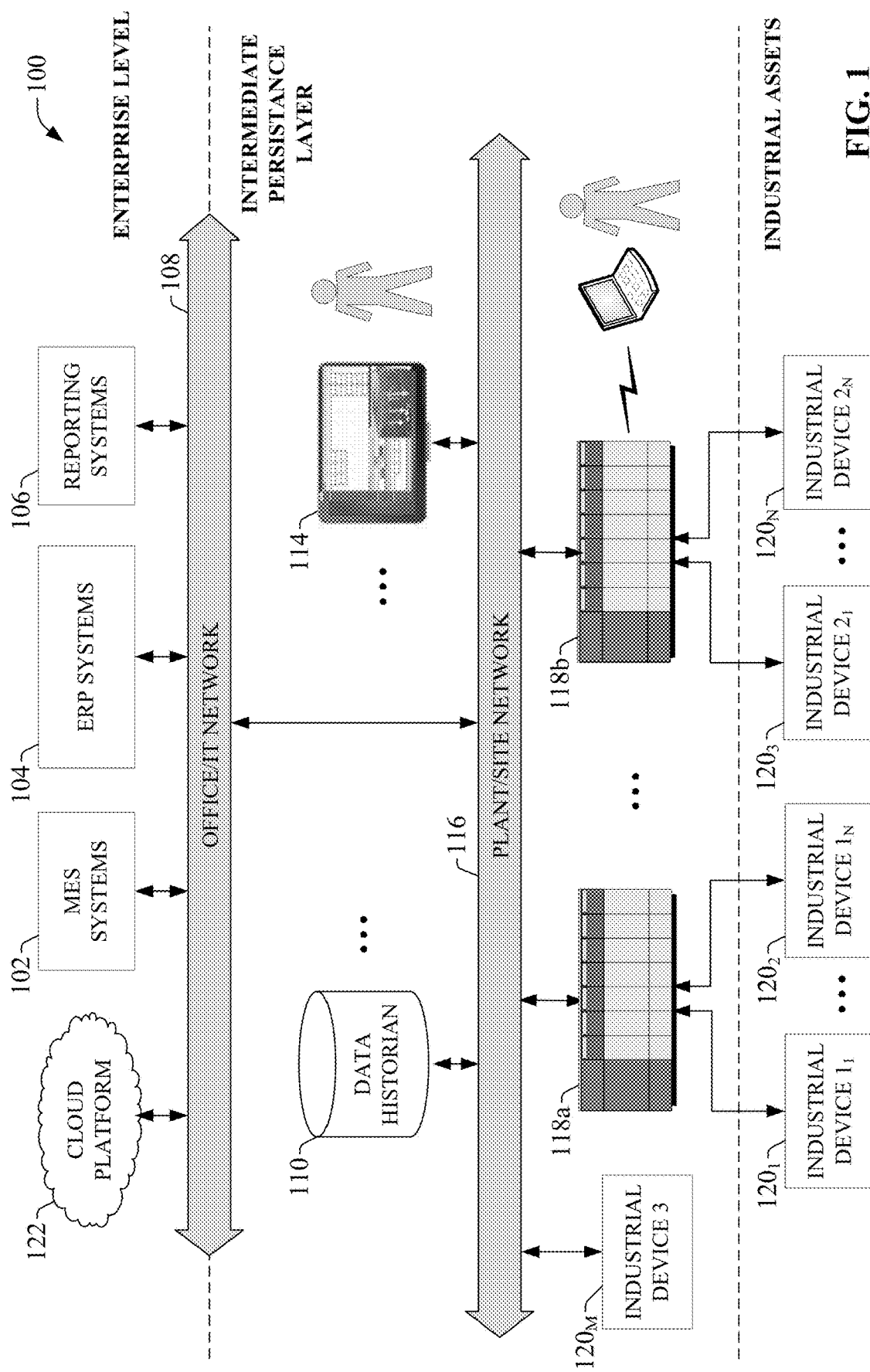
FIG. 1 is a block diagram of an example industrial control environment within a plant operational technology (OT) network in conjunction with representative components of an information technology (IT) network.

The subject disclosure is now described with reference to the drawings, wherein like reference numerals are used to refer to like elements throughout. In the following description, for purposes of explanation, numerous specific details are set forth in order to provide a thorough understanding thereof. It may be evident, however, that the subject disclosure can be practiced without these specific details. In other instances, well-known structures and devices are shown in block diagram form in order to facilitate a description thereof.

As used in this application, the terms "component," "system," "platform," "layer," "controller," "terminal," "station," "node," "interface" are intended to refer to a computer-related entity or an entity related to, or that is part of, an operational apparatus with one or more specific functionalities, wherein such entities can be either hardware, a combination of hardware and software, software, or software in execution. For example, a component can be, but is not limited to being, a process running on a processor, a processor, a hard disk drive, multiple storage drives (of optical or magnetic storage medium) including affixed (e.g., screwed or bolted) or removable affixed solid-state storage drives; an object; an executable; a thread of execution; a computer-executable program, and/or a computer. By way of illustration, both an application running on a server and the server can be a component. One or more components can reside within a process and/or thread of execution, and a component can be localized on one computer and/or distributed between two or more computers. Also, components as described herein can execute from various computer readable storage media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry which is operated by a software or a firmware application executed by a processor, wherein the processor can be internal or external to the apparatus and executes at least a part of the software or firmware application. As yet another example, a component can be an apparatus that provides specific functionality through electronic components without mechanical parts, the electronic components can include a processor therein to execute software or firmware that provides at least in part the functionality of the electronic components. As further yet another example, interface(s) can include input/output (I/O) components as well as associated processor, application, or Application Programming Interface (API) components. While the foregoing examples are directed to aspects of a component, the exemplified aspects or features also apply to a system, platform, interface, layer, controller, terminal, and the like.

As used herein, the terms "to infer" and "inference" refer generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

In addition, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

Furthermore, the term "set" as employed herein excludes the empty set; e.g., the set with no elements therein. Thus, a "set" in the subject disclosure includes one or more elements or entities. As an illustration, a set of controllers includes one or more controllers; a set of data resources includes one or more data resources; etc. Likewise, the term "group" as utilized herein refers to a collection of one or more entities; e.g., a group of nodes refers to one or more nodes.

Various aspects or features will be presented in terms of systems that may include a number of devices, components, modules, and the like. It is to be understood and appreciated that the various systems may include additional devices, components, modules, etc. and/or may not include all of the devices, components, modules etc. discussed in connection with the figures. A combination of these approaches also can be used.

Industrial controllers, their associated I/O devices, motor drives, and other such industrial devices are central to the operation of modern automation systems. Industrial controllers interact with field devices on the plant floor to control automated processes relating to such objectives as product manufacture, material handling, batch processing, supervisory control, and other such applications. Industrial controllers store and execute user-defined control programs to effect decision-making in connection with the controlled process. Such programs can include, but are not limited to, ladder logic, sequential function charts, function block diagrams, structured text, or other such platforms.

FIG. 1 is a block diagram of an example industrial control environment 100. In this example, a number of industrial controllers 118 are deployed throughout an industrial plant environment to monitor and control respective industrial systems or processes relating to product manufacture, machining, motion control, batch processing, material handling, or other such industrial functions. Industrial controllers 118 typically execute respective control programs to facilitate monitoring and control of industrial devices 120 making up the controlled industrial assets or systems (e.g., industrial machines). One or more industrial controllers 118 may also comprise a soft controller executed on a personal computer or other hardware platform, or on a cloud platform. Some hybrid devices may also combine controller functionality with other functions (e.g., visualization). The control programs executed by industrial controllers 118 can comprise any conceivable type of code used to process input signals read from the industrial devices 120 and to control output signals generated by the industrial controllers, including but not limited to ladder logic, sequential function charts, function block diagrams, or structured text.

Industrial devices 120 may include both input devices that provide data relating to the controlled industrial systems to the industrial controllers 118, and output devices that respond to control signals generated by the industrial controllers 118 to control aspects of the industrial systems. Example input devices can include telemetry devices (e.g., temperature sensors, flow meters, level sensors, pressure sensors, etc.), manual operator control devices (e.g., push buttons, selector switches, etc.), safety monitoring devices (e.g., safety mats, safety pull cords, light curtains, etc.), and other such devices. Output devices may include motor drives, pneumatic actuators, signaling devices, robot control inputs, valves, and the like. Some industrial devices, such as industrial device 120M, may operate autonomously on the plant network 116 without being controlled by an industrial controller 118.

Industrial controllers 118 may communicatively interface with industrial devices 120 over hardwired or networked connections. For example, industrial controllers 118 can be equipped with native hardwired inputs and outputs that communicate with the industrial devices 120 to effect control of the devices. The native controller I/O can include digital I/O that transmits and receives discrete voltage signals to and from the field devices, or analog I/O that transmits and receives analog voltage or current signals to and from the devices. The controller I/O can communicate with a controller's processor over a backplane such that the digital and analog signals can be read into and controlled by the control programs. Industrial controllers 118 can also communicate with industrial devices 120 over the plant network 116 using, for example, a communication module or an integrated networking port. Exemplary networks can include the Internet, intranets, Ethernet, DeviceNet, ControlNet, Data Highway and Data Highway Plus (DH/DH+), Remote I/O, Fieldbus, Modbus, Profibus, wireless networks, serial protocols, and the like. The industrial controllers 118 can also store persisted data values that can be referenced by the control program and used for control decisions, including but not limited to measured or calculated values representing operational states of a controlled machine or process (e.g., tank levels, positions, alarms, etc.) or captured time series data that is collected during operation of the automation system (e.g., status information for multiple points in time, diagnostic occurrences, etc.). Similarly, some intelligent devices—including but not limited to motor drives, instruments, or condition monitoring modules—may store data values that are used for control and/or to visualize states of operation. Such devices may also capture time-series data or events on a log for later retrieval and viewing.

Industrial automation systems often include one or more human-machine interfaces (HMIs) 114 that allow plant personnel to view telemetry and status data associated with the automation systems, and to control some aspects of system operation. HMIs 114 may communicate with one or more of the industrial controllers 118 over a plant network 116, and exchange data with the industrial controllers to facilitate visualization of information relating to the controlled industrial processes on one or more pre-developed operator interface screens. HMIs 114 can also be configured to allow operators to submit data to specified data tags or memory addresses of the industrial controllers 118, thereby providing a means for operators to issue commands to the controlled systems (e.g., cycle start commands, device actuation commands, etc.), to modify setpoint values, etc. HMIs 114 can generate one or more display screens through which the operator interacts with the industrial controllers 118, and thereby with the controlled processes and/or systems. Example display screens can visualize present states of industrial systems or their associated devices using graphical representations of the processes that display metered or calculated values, employ color or position animations based on state, render alarm notifications, or employ other such techniques for presenting relevant data to the operator. Data presented in this manner is read from industrial controllers 118 by HMIs 114 and presented on one or more of the display screens according to display formats chosen by the HMI developer. HMIs may comprise fixed location or mobile devices with either user-installed or pre-installed operating systems, and either user-installed or pre-installed graphical application software.

Some industrial environments may also include other systems or devices relating to specific aspects of the controlled industrial systems. These may include, for example, one or more data historians 110 that aggregate and store production information collected from the industrial controllers 118 and other industrial devices.

Industrial devices 120, industrial controllers 118, HMIs 114, associated controlled industrial assets, and other plant-floor systems such as data historians 110, vision systems, and other such systems operate on the operational technology (OT) level of the industrial environment. Higher level analytic and reporting systems may operate at the higher enterprise level of the industrial environment in the information technology (IT) domain; e.g., on an office network 108 or on a cloud platform 122. Such higher level systems can include, for example, enterprise resource planning (ERP) systems 104 that integrate and collectively manage high-level business operations, such as finance, sales, order management, marketing, human resources, or other such business functions. Manufacturing Execution Systems (MES) 102 can monitor and manage control operations on the control level given higher-level business considerations. Reporting systems 106 can collect operational data from industrial devices on the plant floor and generate daily or shift reports that summarize operational statistics of the controlled industrial assets.

Because of the large number of system variables that must be monitored and controlled in near real-time, industrial automation systems often generate vast amounts of near real-time data. In addition to production statistics, data relating to machine health, alarm statuses, operator feedback, electrical or mechanical load over time, and the like are often monitored, and in some cases recorded, on a continuous basis. This data is generated by the many industrial devices that make up a typical automation system, including the industrial controller and its associated I/O, telemetry devices for near real-time metering, motion control devices (e.g., drives for controlling the motors that make up a motion system), visualization applications, lot traceability systems (e.g., barcode tracking), etc. Moreover, since many industrial facilities operate on a 24-hour basis, their associated automation systems can generate a vast amount of potentially useful data at high rates. The amount of generated automation data further increases as additional plant facilities are added to an industrial enterprise.

To gain insights into the operation of plant-floor assets, automation systems, and processes, this high-density industrial data can be collected and streamed to an analytics, visualization, or reporting system via a data pipeline, or a network of parallel data pipelines. However, configuring such data pipelines is a specialized task, often requiring the services of a data engineer or data scientist having a high level of expertise.

Also, in some scenarios, pretrained analytic models, such as machine learning models, may be available for generating insights or predictions relating to plant floor operations based on analysis of a specified subset of data generated by plant floor devices. However, if these models were developed by an external engineer with no knowledge of the end user's available data or the schema and naming conventions for that data, integrating these analytic models into a data-contextualized enterprise-specific data pipeline can be challenging.

To address these and other issues, one or more embodiments described herein provide a data pipeline configuration system that allows data pipelines to be configured using an intuitive visual interface. The pipeline configuration system allows graphical pipeline components representing data sources, data processing, analytic and machine learning (ML) models, and emitters to be selectively added to a data pipeline application by selecting these components from a preconfigured library, also referred to as a palette. The pipeline application is created by arranging and linking these selected pipeline components within a graphical development interface rendered by the system. The development interface also allows analytic or machine learning models created and trained a priori to be easily imported into the pipeline application and mapped to incoming data items via adapters (e.g., channels) of various data sources, such that the model is scored against incoming data during pipeline operation. The configuration system also allows the user to configure the pipeline to publish selected data items and model scoring results to specified destinations or data sinks.

Figure 2:
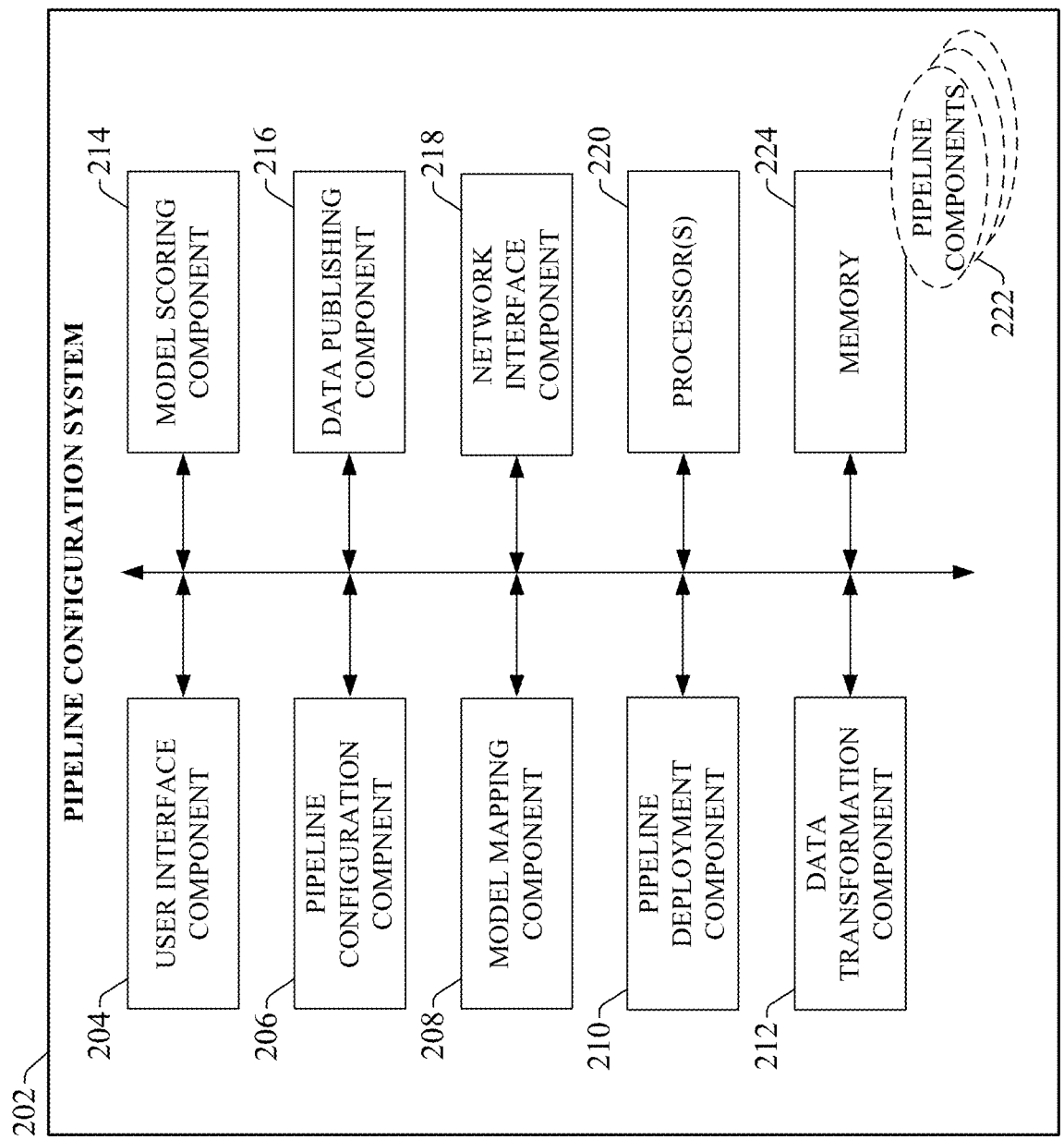
FIG. 2 is a block diagram of a pipeline configuration system.

FIG. 2 is a block diagram of a pipeline configuration system 202 according to one or more embodiments of this disclosure. Aspects of the systems, apparatuses, or processes explained in this disclosure can constitute machine-executable components embodied within machine(s), e.g., embodied in one or more computer-readable mediums (or media) associated with one or more machines. Such components, when executed by one or more machines, e.g., computer(s), computing device(s), automation device(s), virtual machine(s), etc., can cause the machine(s) to perform the operations described.

Pipeline configuration system 202 can include a user interface component 204, a pipeline configuration component 206, a model mapping component 208, a pipeline deployment component 210, a data transformation component 212, a data scoring component 214, a data publishing component 216, a network interface component 218, one or more processors 220, and memory 224. In various embodiments, one or more of the user interface component 204, pipeline configuration component 206, model mapping component 208, pipeline deployment component 210, data transformation component 212, data scoring component 214, data publishing component 216, network interface component 218, the one or more processors 220, and memory 224 can be electrically and/or communicatively coupled to one another to perform one or more of the functions of the pipeline configuration system 202. In some embodiments, components 204, 206, 208, 210, 212, 214, 216, and 218 can comprise software instructions stored on memory 224 and executed by processor(s) 218. Pipeline configuration system 202 may also interact with other hardware and/or software components not depicted in FIG. 2. For example, processor(s) 220 may interact with one or more external user interface devices, such as a keyboard, a mouse, a display monitor, a touchscreen, or other such interface devices.

User interface component 204 can be configured to generate user interface displays that receive user input and render output to the user in any suitable format (e.g., visual, audio, tactile, etc.). In some embodiments, user interface component 204 can render these interface displays on a client device (e.g., a laptop computer, tablet computer, smart phone, etc.) that is communicatively connected to the pipeline configuration system 202 (e.g., via a hardwired or wireless connection). Input data that can be received via user interface component 204 can include, but is not limited to, pipeline design input that selects and configures pipeline components and analytic models for inclusion in the pipeline, mapping input that maps selected data items to input fields of a selected model, or other such input data. Output data rendered by user interface component 204 can include, but is not limited to, pipeline components and models that can be selectively integrated into a data pipeline configuration, parameters of analytic or machine learning models, model scoring results, or other such output data.

Pipeline configuration component 206 can be configured to generate an application based on pipeline configuration input received from a user via user interface component 204. Model mapping component 208 can be configured to map selected input data variables from one or more data sources—either batch or streaming data—to inputs of an analytic model included in the data pipeline. Pipeline deployment component 210 can be configured to deploy the pipeline application generated by pipeline configuration component 206 to one or more nodes of a pipeline runtime environment for execution.

Data transformation component 212 can be configured to transform incoming data to a format that can be understood by pipeline processing components, and that can be mapped to an analytic model (such as a machine learning model) included in the data pipeline. Model scoring component 214 can be configured to apply a selected analytic model to the transformed data generated by data transformation component 212 to generate a model scoring output, also referred to as a model prediction. Data publishing component 216 can be configured to publish results of the model scoring performed by the model scoring component 214 to a specified data sink (e.g., a data repository, an application, an asset model, etc.) outside the pipeline development platform. Network interface component 218 can be configured to interface the pipeline configuration system 202 to one or more networks, allowing the user to browse for external analytic models or applications that are to be incorporated into the pipeline. These models can include, for example, machine learning models created and trained in external applications, which can then be selectively incorporated into the data pipeline using the development interface.

The one or more processors 220 can perform one or more of the functions described herein with reference to the systems and/or methods disclosed. Memory 224 can be a computer-readable storage medium that stores computer-executable instructions and/or information for performing the functions described herein with reference to the systems and/or methods disclosed. Memory 224 can also store pre-defined pipeline components 222 which can be selected and integrated into the pipeline design.

Figure 3:
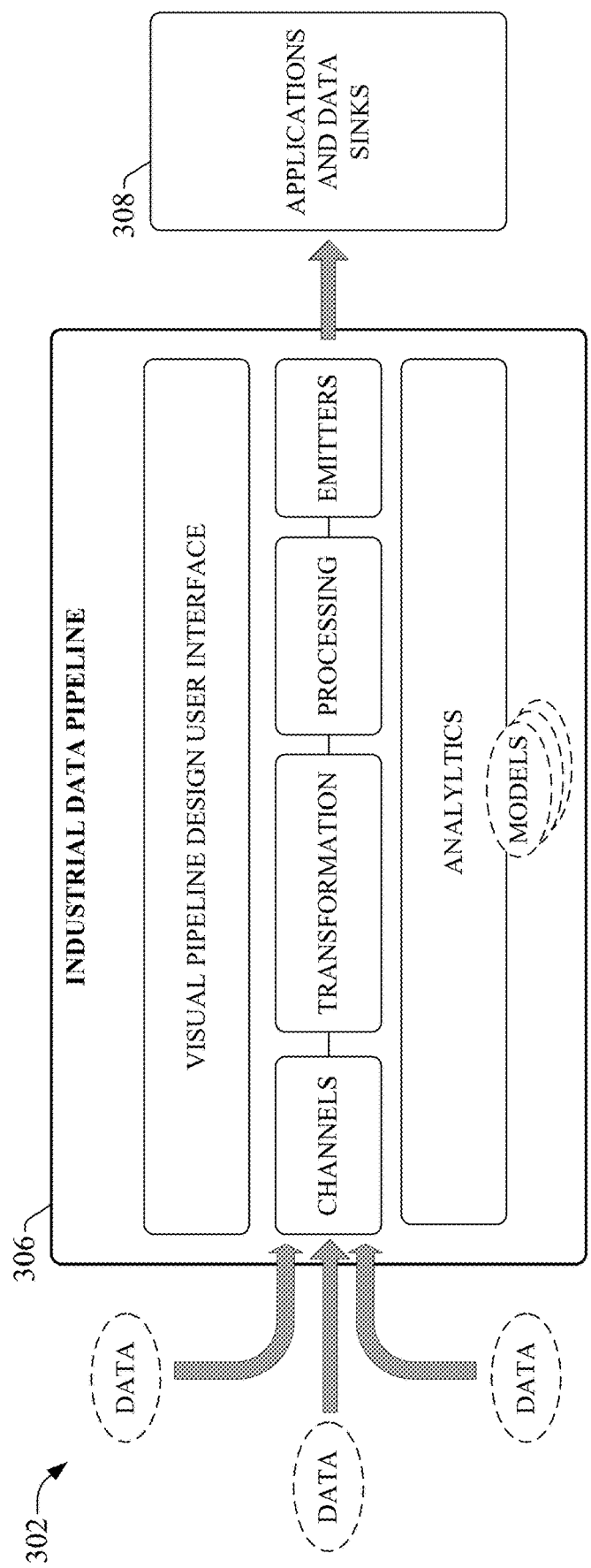
FIG. 3 is a diagram illustrating a generalized data pipeline that can be implemented using embodiments of the pipeline configuration system.

FIG. 3 is a diagram illustrating a generalized data pipeline that can be implemented using embodiments of the pipeline configuration system 202. A data pipeline 306 can be implemented on one or more pipeline nodes or other hardware platforms capable of relaying or streaming aggregated data 302 collected from one or more data sources to a destination 308, which may be a data repository (e.g., cloud-based storage), an application that consumes the data (e.g., an analytic or reporting system), an industrial control system, an asset model or digital twin used in connection with monitoring and controlling an industrial asset or system, or another type of data destination. In the example illustrated in FIG. 3, data 302 is collected from one or more types of data sources (e.g., databases, data historians, cloud-based repositories, industrial controllers, motor drives, telemetry devices, etc.) via one or more channels of the pipeline. The nodes that execute the pipeline may be server devices, restful API-based external calls, microservices executing on respective computer hardware platforms, or other such processing elements.

The pipeline 306 can include components that perform processing on the data 302. This can include processing to transform the incoming data to a format that can be understood by downstream pipeline components, and that can be mapped to analytic models or other data processing units or components included in the pipeline. These downstream pipeline components can also include a user's custom code (e.g., code written in Python, Java, or Scala). The pipeline 306 can also be configured to perform model-based analytics on selected sets of the data 302.

The pipeline configuration system 202 supports a visual design interface that allows elements of this pipeline 306 to be easily configured and deployed. This can include interacting with a graphical development interface to select processing and analytic components for inclusion in the pipeline 306, map incoming data to analytic models that have been added to the pipeline, and configure the data emitters that publish data and analytic results to selected external applications or data sinks. The resulting pipeline 306 is also capable of parsing incoming data 302 to automatically learn the data's schema, and transforming the data to a format that can be understood by other downstream processing components of the pipeline 306 and that can be easily mapped to the succeeding processing components and analytic models (including but not limited to machine learning models).

Figure 4:
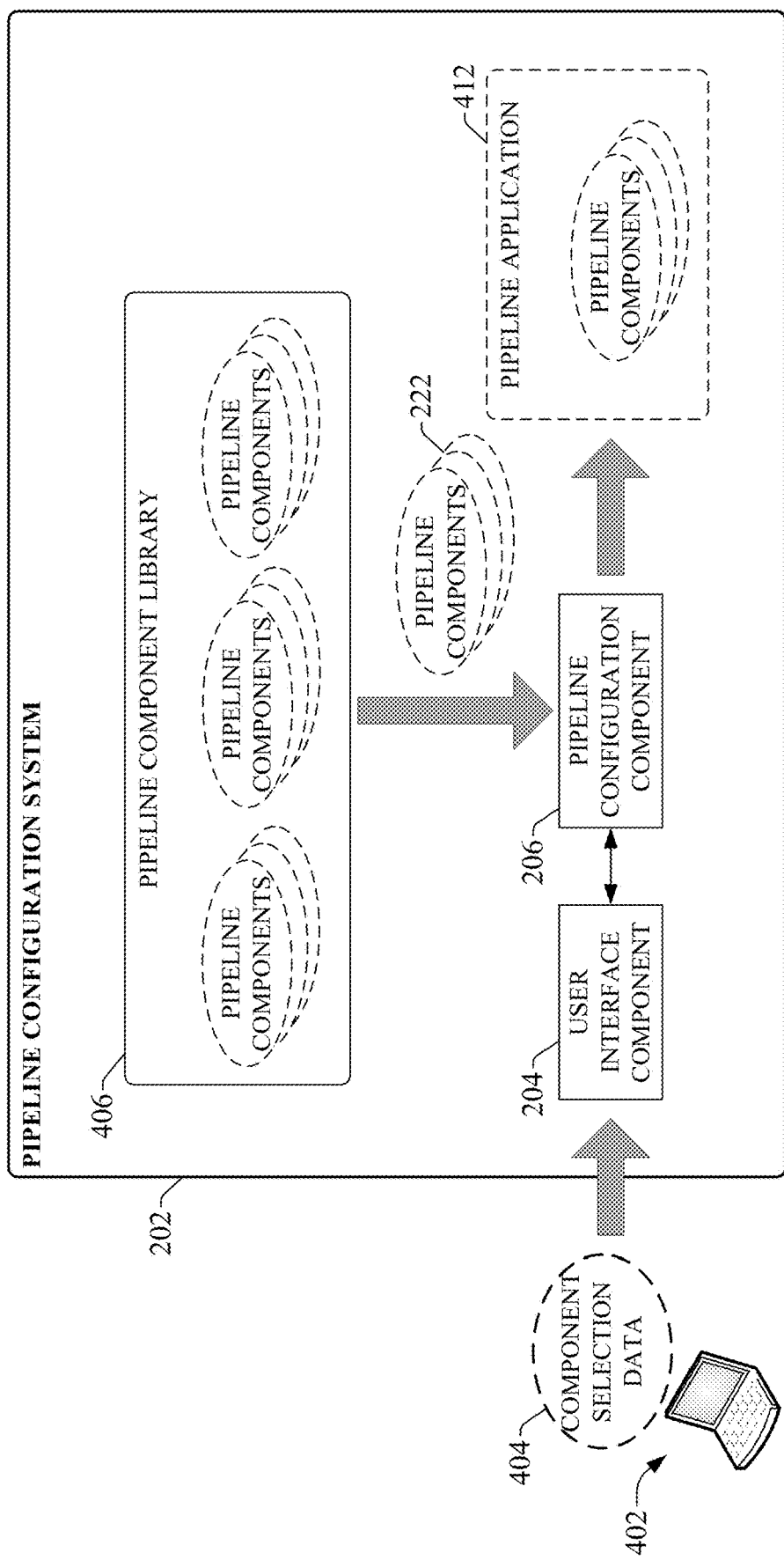
FIG. 4 is a diagram illustrating selection of pipeline components for inclusion in a pipeline application using a pipeline configuration system.

As noted above, pipeline configuration system 202 can provide visual design tools that guide the user through an intuitive workflow for creating data pipeline applications, which can then be deployed and executed on hardware nodes running a highly scalable parallelized runtime engine. This design workflow uses graphical icons representing processing and analytic components, which can be selected for inclusion in the data pipeline and configured within the system's graphical development environment. FIG. 4 is a diagram illustrating selection of pipeline components 410 for inclusion in a pipeline application 412. In general, the system's pipeline configuration component 206 generates a pipeline application 412 based on design input submitted by the user, and updates this application 412 accordingly based on the received design input. The pipeline application 412 comprises components that ingress data that, when deployed and executed on one or more execution cluster nodes, performs the data transfer, processing, analytic, and emitter functions specified by the pipeline configuration.

Figure 5:
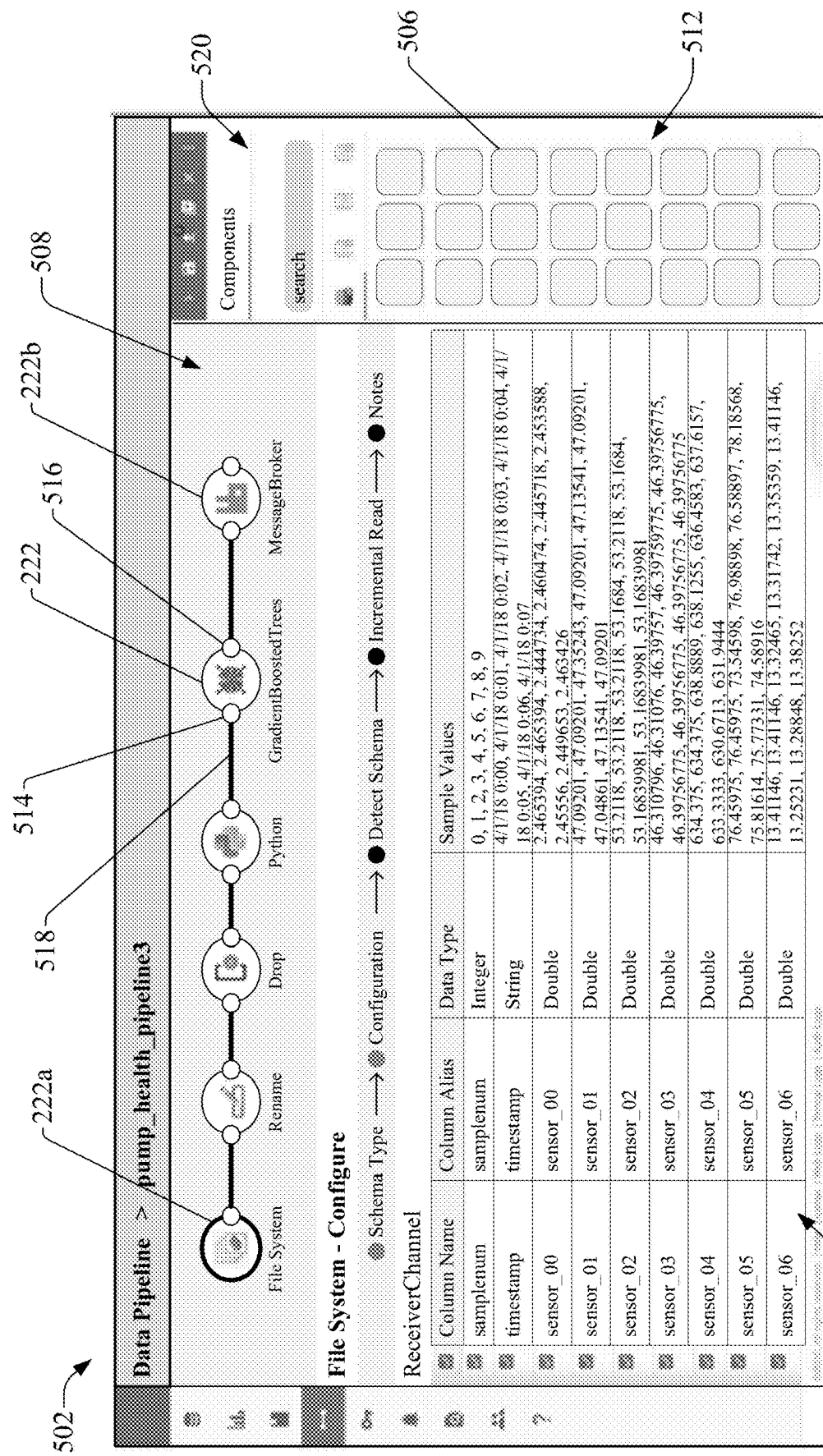
FIG. 5 is an example user interface display that can be generated by a pipeline configuration system and used to select pipeline components for inclusion in a pipeline application.

Pipeline configuration system 202 can include a component library 406 that stores various processing and analytic components 222 that can be selectively included in the pipeline application being configured. Library 406 can also include machine learning model creation components. Through interaction with the development environment generated by user interface component 204 and served to a client device 402, a user can submit component selection data 404 that selects a subset of available pipeline components 222 from the library 406 (or palette) for inclusion in the pipeline application 412. FIG. 5 is an example user interface display 502 that can be generated by user interface component 204 and used to select pipeline components 222 for inclusion in a pipeline application. Display 502 includes a pipeline builder section 508 (also referred to as a canvas), a component selection section 512, a component configuration section 510, and a user action palette 520. The user action palette 520 allows the user to select and initiate a number of high-level instructions, such as creating a new pipeline, saving the current pipeline, and uploading the current pipeline. Pipeline components 222 that can be selected for inclusion in the pipeline application are represented by components icons 506 in the component selection section 512. Selection of a component icon 506 from the component selection section 512 causes a graphical representation of the pipeline component 222 corresponding to the selected icon 506 to appear in the pipeline builder section 508. In some embodiments, selected component icons 506 can be dragged from the component selection section 512 to the pipeline builder section 508 to facilitate adding the pipeline components 222 corresponding to the selected icons 506 to the pipeline application 412. components 222 can also be added using other interactions with the development interface, including but not limited to double-clicking or otherwise selecting the icons 506. Once in the pipeline builder section 508, a component 222 can be moved and arranged by the user.

An icon representing pipeline component 222 can have an associated input 514 and output 516. In the pipeline builder section 508, the user can arrange selected pipeline components 222 and selectively link outputs 516 of components 222 to inputs 514 of other succeeding or downstream components 222 using connector lines 518. In this way, the data pipeline can be designed by arranging and linking selected pipeline components 222 in an order that will be validated during design-time, yielding a data flow definition with discrete processing units. In some design scenarios, the order of the components 222 within the pipeline builder section 508 can determine the order of data preparation, processing, transformation, analytics, or machine learning model execution that will be carried out by the pipeline represented by the application 412, such that these functions will be executed in a cadence within the scope of the pipeline application 412 when deployed and executed on a runtime execution engine.

Pipeline components 222 can represent various types of entities, processing, analytics, or ML model applications that the user wishes to include in the pipeline. In a typical pipeline application, the left-most components in the pipeline representation can be a data source component 222a representing a data source for the data 302 that will be batched or streamed through the pipeline. The data source can be an industrial device (e.g., an industrial controller, a variable frequency drive, etc.), a data historian, a file system from which data is retrieved, an edge device (e.g., edge device 304) that collects input data and places the data on the pipeline, one or more industrial devices operating in a plant facility (e.g., industrial controllers, motor drives, sensors, telemetry devices, etc.), another application that generates data to be placed on the pipeline (e.g., via native connectivity), in-memory message queues or persistent stores that store data accumulated from an industrial controller or edge device, a database, a data warehouse, a data lake within a same network or on a cloud platform, rest application programming interface (API) calls, a software development kit (SDK) integrated into the system 202 or from a shared file system on the same network on which the execution runtime engine is deployed, or other such data sources. The data from any of these data sources is ingested into the memory of pipeline configuration system 202 for further use by succeeding data pipeline components. The component library 406 can include a variety of data source components 222a representing different types of data sources, which can be selectively added to the pipeline design and configured to map to the user's data source.

The right-most pipeline component 222 can be an emitter component 222b representing a destination or data sink to which data ingested and processed by the pipeline is to be published. This destination can be substantially any external application or system that consumes the data 302 or processing results that are output by the pipeline. In some embodiments, pipeline configuration system 202 can support adapters or custom-coded emitters designed to interface with specific types of data sinks, and which are associated with respective emitter components 222b. Example destinations for the pipeline output data can include, but are not limited to, visualization systems that visualize the pipeline output, reporting systems, other analytic systems, message broker systems that send notifications to specified recipients based on analytic results output by the pipeline, a control application on the plant floor that makes adjustments to an industrial process based on the analytic results, or other such destinations. As with the data sources, the component library 406 can include emitter components 222b representing a variety of different data destinations or data sinks, which can be added to the pipeline application and configured such that selected data items processed by the pipeline are mapped to specified data points of the data destination entity.

Intermediate pipeline components 222 between the left-most and right-most components 222 can represent selected types of processing, analytics, or machine learning models to be applied to the data. Example processing components 222 can include, but are not limited to, components for cleaning the data (e.g., by detecting and removing outlier data), transforming the data from an input format to a specified target format, renaming data items, or performing other such data processing. These various types of data processing can be represented by pipeline components 222 stored in library 406, which can be selectively added to the pipeline design and configured to perform their processing functions on selected sets of data 302.

As will be described in more detail below, pipeline configuration system 202 can also allow analytic models, such as machine learning models, to be added to the pipeline configuration as pipeline components 222 and mapped to selected sets of pipeline data.

Once a pipeline component 222 has been added to the pipeline builder section 508, selection of one of the pipeline components 222 within the pipeline builder section 508 causes configuration information for the selected component 222 to be displayed in the component configuration section 510. The configuration information displayed in the component configuration section 510 depends on the type of component 222 selected. In the example depicted in FIG. 5, the data source component 222a has been selected. If this data source component 222a has been linked to its corresponding data source, the component configuration section 510 displays information about the data items available in that data source, including the name and data type of each data item and sample values read from the data items. Other types of pipeline components 222 will render different sets of attributes and configurable parameters associated with those components. For a given pipeline component 222, some of the component attributes displayed in the component configuration section 510 may be configurable by the user, such that the values of these attributes can be changed via interaction with the component configuration section 510 (e.g., by overwriting the displayed values of the attribute).

Different data sources can generate data 302 that accords to their own particular data schema, which determine the data items that are available from the data source, the information model naming conventions or data tag names used to identify the data items, the data types of the respective data items, etc. The data schema of incoming data 302 may not match the format or schema requirement of the external application that will be consuming the batched or streamed data from the pipeline emitter component. To address this issue, the pipeline component library 406 can include data preparation components capable of parsing incoming data 302 from a specified data source, identifying the data's schema, and converting the data 302 to a format that can be understood and used by downstream pipeline processing components and, eventually, by the external application or data sink that will consume the data from the data pipeline.

Figure 6:
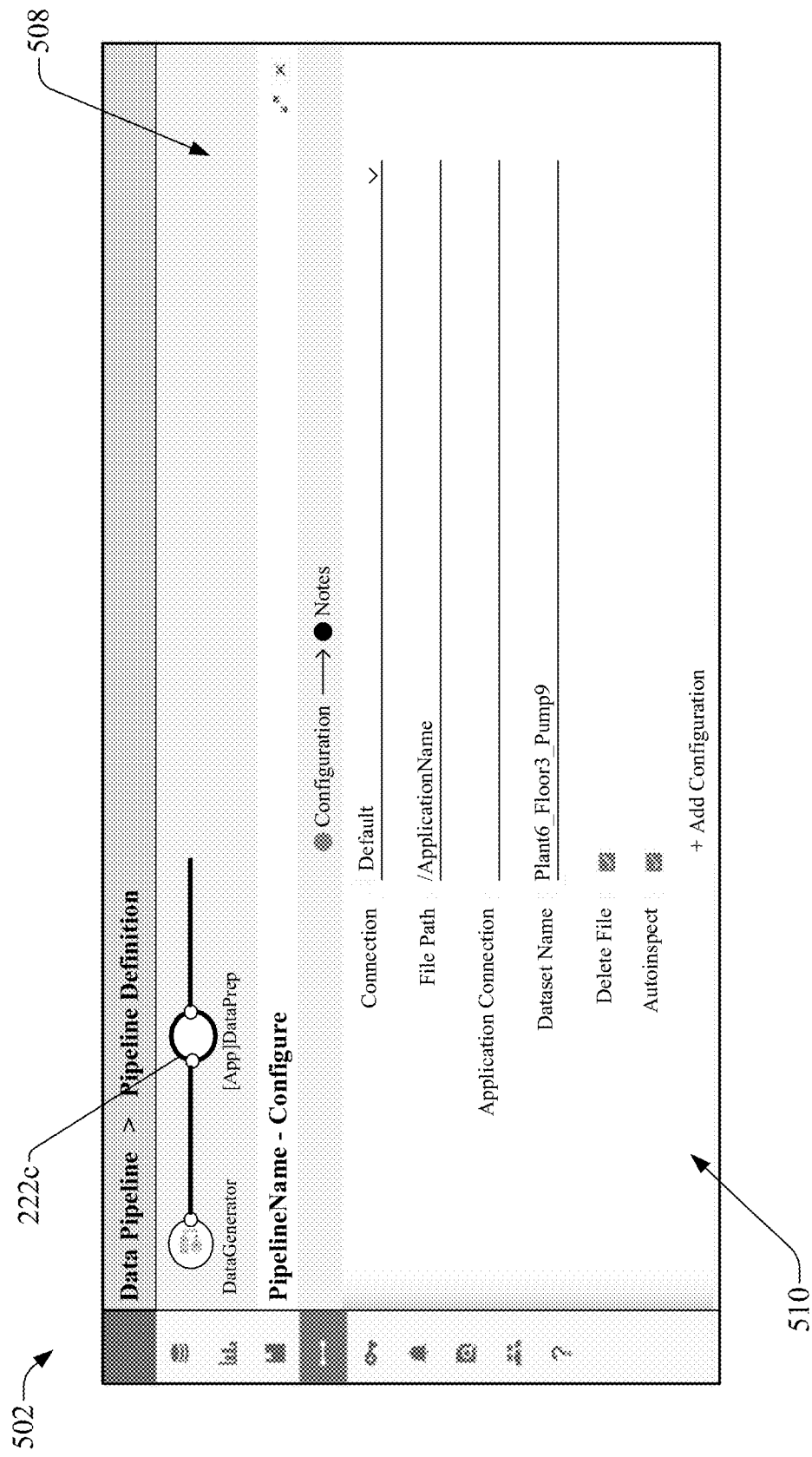
FIG. 6 is a user interface display in which a data preparation component has been added to a pipeline design in a pipeline builder section.

FIG. 6 is a view of user interface display 502 in which a data preparation component 222c has been added to a pipeline design in the pipeline builder section 508. The input of the data preparation component 222c has been linked to the output of a data generator component representing a source of data 302 that is to be placed on the pipeline. In some embodiments, pipeline configuration system 202 can offer different types of data preparation components 222c corresponding to respective different types of applications for which the data is being prepared. Configuration information for the data preparation component 222c is displayed in the component configuration section 510. This information can include connection and file path information for the incoming data 302 and/or the external application for which the data is being prepared, a name of the converted data set that will be output by the data preparation component 222c, or other configuration information.

Adding the data preparation component 222c to the pipeline path inserts a data preparation processing function into the pipeline. This processing scans or parses the data 302 received from the data source, identifies the data's schema, and based on this knowledge of the data's schema, converts the incoming data 302 to a format that can be used by downstream pipeline processors. In an example scenario, the data preparation processing can receive unstructured data 302, or data that is structured according to a schema that is incompatible with a downstream application in the pipeline, and convert this incoming data 302 to a comma-separated values (CSV) file understandable by the downstream pipeline processor and, eventually, by the external application or data sink that consumes the data egressed by the data pipeline. This comma-separated format can be understood and acted upon by downstream pipeline applications data processing units. Since the data preparation processing performed by the data preparation component 222c auto-detects the schema of the incoming data, data engineers need not design their data collection systems to pre-specify this incoming data schema to the configuration system 202.

Figure 7:
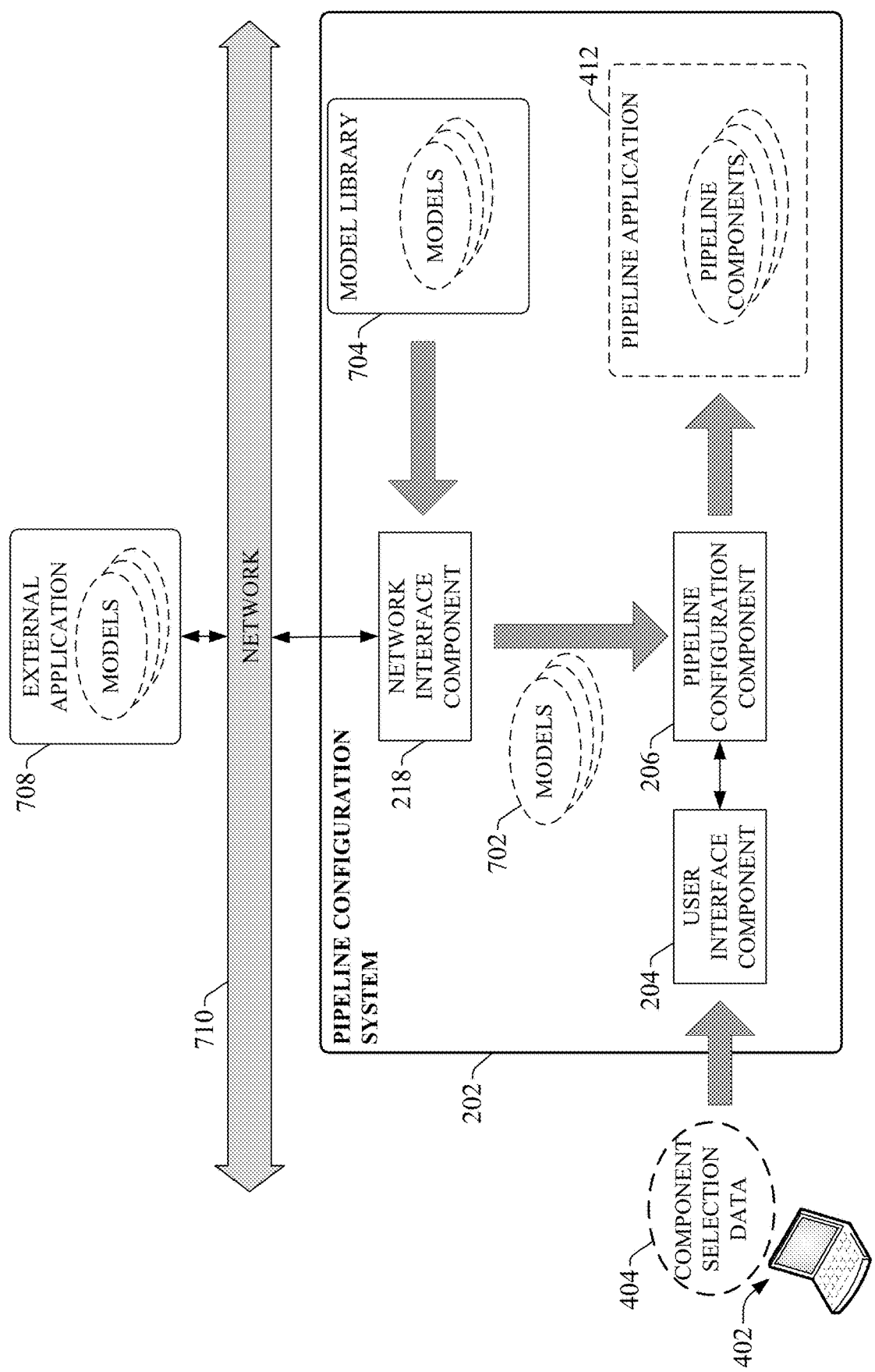
FIG. 7 is a diagram illustrating selection of analytic models for inclusion in a pipeline design.

As noted above, the system 202 also allows analytic models, such as machine learning models, to be added to the pipeline application 412 as pipeline components. FIG. 7 is a diagram illustrating selection of analytic models 702 for inclusion in the pipeline design. In some embodiments, the system 202 can allow a user to select from among pretrained analytic or machine learning models stored on a model library 704. In addition or alternatively, the system 202 can allow the user to browse for and select models 702 that are stored externally to the configuration system 202. These external models can be, for example, models executed by external applications 708 (e.g., third-party applications that offer analytic models that can be applied to end user data) or models that were otherwise developed in a separate development system. In the example depicted in FIG. 7, the pipeline configuration system 202 is interfaced to a network 710 (e.g., a plant and/or office network) via network interface component 218, and through this connection the system 202 allows the user to browse models stored on an external application 708 on the same network 710. In this way, users can either select from a library 704 of locally stored analytic models 702 offered by the configuration system 202, or import analytic models 702 that were developed by external systems. Analytic models 702 from any of these sources can be selectively added to the pipeline application 412 as a pipeline component 222.

Figure 8:
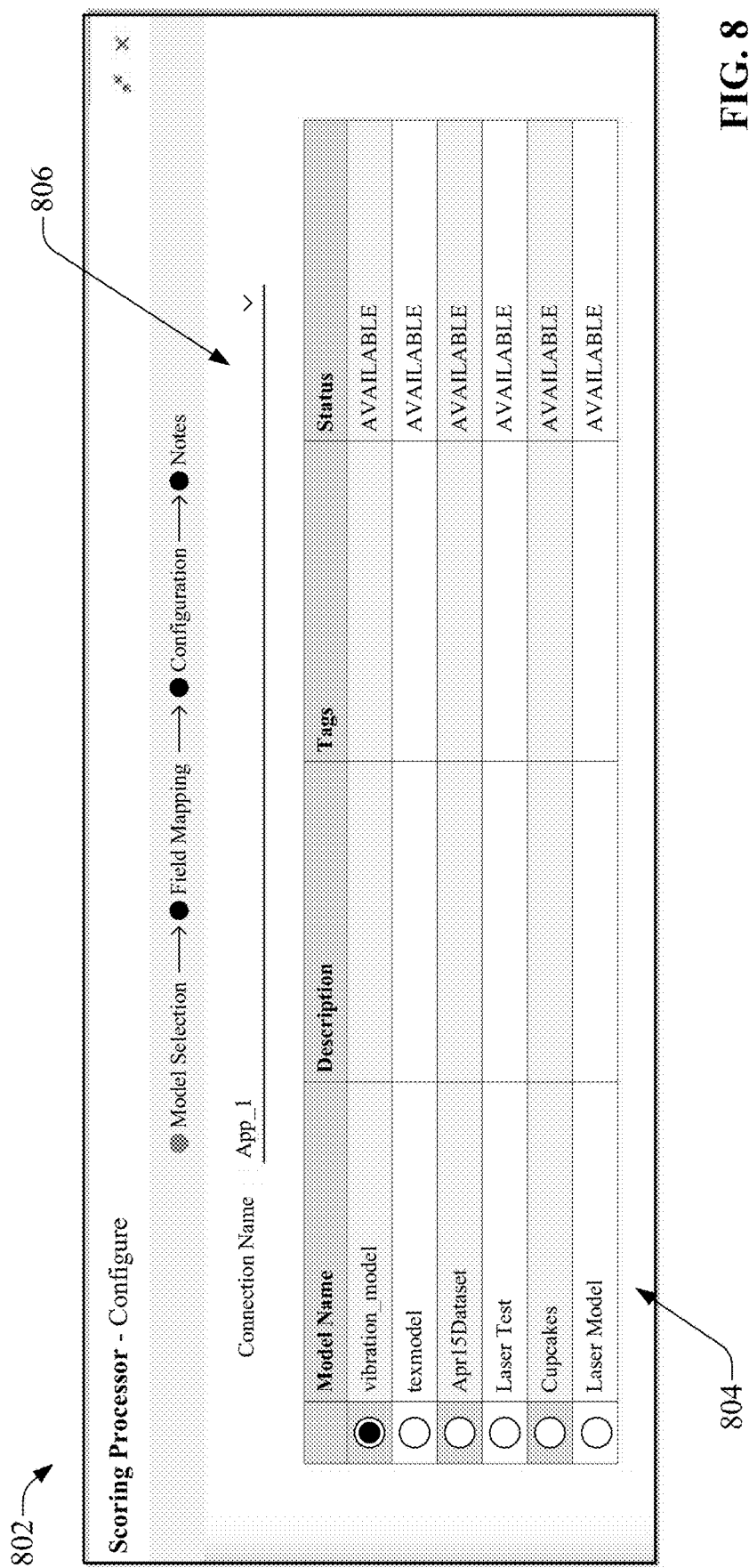
FIG. 8 is an example interface display that can be generated by a pipeline configuration system and used to browse available models for inclusion in a pipeline design.

FIG. 8 is an example interface display 802 that can be generated by user interface component 204 and used to browse available models 702 for inclusion in a pipeline design. This example interface display 802 includes a Connection Name field 806 that allows the user to specify a connection to an external application having available analytic models. Connections to external applications having available analytic models 702 can be defined using a connection tool supported by the pipeline configuration system 202. Once defined, these connections are selectable in the Connection Name field 806 via a drop-down window. Upon selection of a connection to an external application, a model list area 804 renders a list of analytic models that are available on the selected external application. This list can render information about each model, including but not limited to a name and description of the model, tags representing the model's inputs and outputs, a current status of the model (e.g., available, unavailable, etc.), a version number of the model, or other such information. The user can then select one or more of the models in the model list area 804 that are to be included in the pipeline, and in response to this selection the pipeline configuration component 206 updates the pipeline application 412 to add the selected models.

Substantially any type of analytic or machine learning models 702 can be incorporated into the pipeline application 412, including but not limited to predictive models, binary classification models, statistical models, regression analysis models, clustering models, decision trees, or other such analytic models. Models 702 may also comprise asset models or digital twins that digitally represent industrial assets in operation in the plant facility. In some embodiments, the pipeline configuration system 202 can also include model building tools that allow the user to create their own custom analytic models for inclusion in the pipeline application. In general, analytic or machine learning models 702 can be trained algorithms designed to analyze specified data inputs to perform such functions as generating predictions regarding operation of an industrial machine or process (e.g., predicting product output, a time-to-failure for a device or machine, energy consumption, machine emissions, etc.), identifying a modification to an industrial process or control parameter that may optimize a performance metric of a controlled industrial asset, calculate statistics regarding operation of an industrial machine or process, or other such analytic functions.

Figure 9:
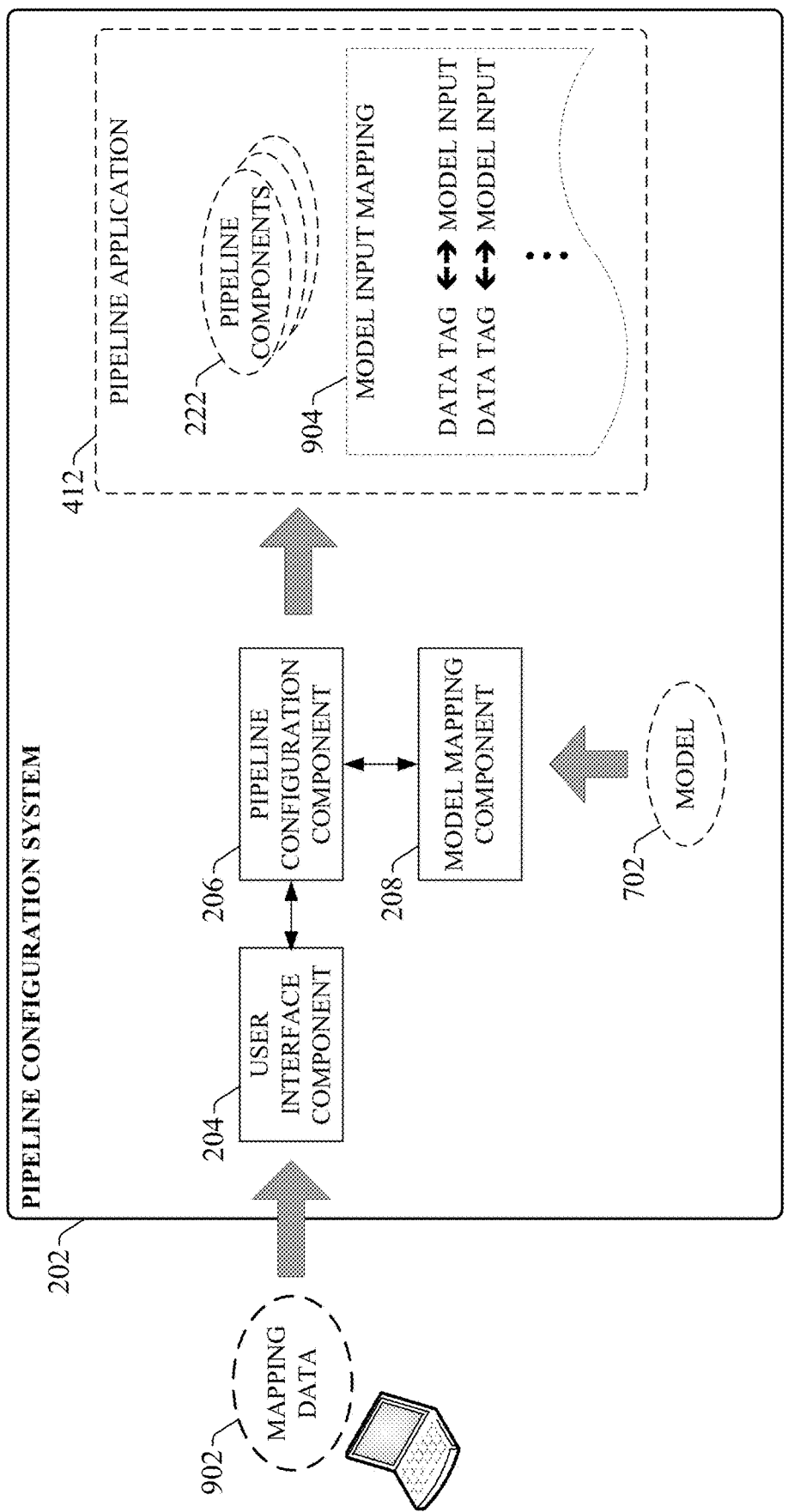
FIG. 9 is a diagram illustrating submission of mapping data that selectively maps items of an incoming data stream to inputs of a selected data model.

A given analytic model 702 is designed to process a specific set of data inputs in order to generate its output. As part of the data pipeline design, configuration system 202 allows the user to map these defined model inputs, or fields, to corresponding data items of their incoming data streams. FIG. 9 is a diagram illustrating submission of mapping data 902 that selectively maps items of an incoming data stream to inputs of a selected data model. After a data source has been added to the pipeline application 412 by adding a data source component 222a, data preparation processing has been configured by adding and configuring a data preparation component 222c, and an analytic model 702 has been added to the pipeline design as described above in connection with FIGS. 7 and 8, user interface component 204 can render a field mapping display that allows the user to submit mapping data 902. This mapping data 902 selects items of data from the specified data source to corresponding input fields of the imported analytic model 702. To facilitate this mapping, the system's model mapping component 208 can parse the selected model 702 to identify the input fields defined for the model 702, which represent the model's digital and/or analog inputs. As part of this model analysis, the model mapping component 208 can identify the name and data type of each of the input fields defined by the model 702. The user interface component 204 can present these input fields to the user and allow the user to submit, as mapping data 902, selections of which data items generated by the pipeline's data sources are to be mapped to corresponding input fields of the analytic model 702. Based on this mapping data 902, pipeline configuration component 206 updates the pipeline application 412 to include the user's defined model input mapping 904.

FIG. 10 is an example field mapping interface display 1002 that can be generated by user interface component 204 and used to perform the model field mapping described above in connection with FIG. 9. As noted above, the model mapping component 208 parses the analytic model 702 being added to the pipeline application 412 (e.g., the model 702 selected using interface display 802) to identify the input fields defined for the model 702. The names of these input fields are listed in a Model Field column of display 1002, and the data types (e.g., Boolean, double floating point, integer, etc.) of each field are listed in an adjacent Type column. Next to each listed input field, under an Input Message Field column, is a selection field 1004 (e.g., a drop-down selection box) that allows the user to select a data item from the pipeline's data source that is to be mapped to that model input field.

The data item selections listed in the selection fields 1004 can be based on the prepared data generated by the data preparation component 222c as a result of performing data preparation processing on the data 302 from the pipeline's data source. For example, if the data preparation component 222c is configured to convert incoming data 302 (either structured or unstructured data) to a CSV file that lists the available items of data 302 as comma-separated data tag names, the user interface component 204 will populate the selection fields 1004 with the data tag names read from this CSV file. Selection of a data item in a selection field 1004 of the Input Message Field column causes the selected data item to be mapped to the corresponding model field entry in the Model Field column. To ensure that the user has mapped a data tag having the same data type as that of the model field, an Input Field Type column can display the data type of the data item selected in the Input Message Field column. In some embodiments, if the data type of the selected data item does not match that of the model field to which it is mapped, the user interface component 204 can render an alarm message 1006 indicating that the data types of the model's input field and its corresponding data item must match.

Since the analytic model 702 may have been developed by a third party with no knowledge of the user's data schema or naming convention, this approach can allow the user to perform a selective one-to-one mapping between each input field of the model and a data item selected by the user as corresponding to that field. Items of data 302 that can be mapped to the model's input fields can include, for example, measured process values generated by telemetry devices (e.g., temperatures, pressures, flows, motor speeds, etc.), alarm indicators (e.g., low grease alarms, high temperature alarms, etc.), device or machine statuses (e.g., running, idle, faulted, etc.), or other such data items. Depending on the number of input fields defined for the model 702, the total number of data items mapped to the model 702 may be less than the total number of data items available from the pipeline's data source.

Figure 11:
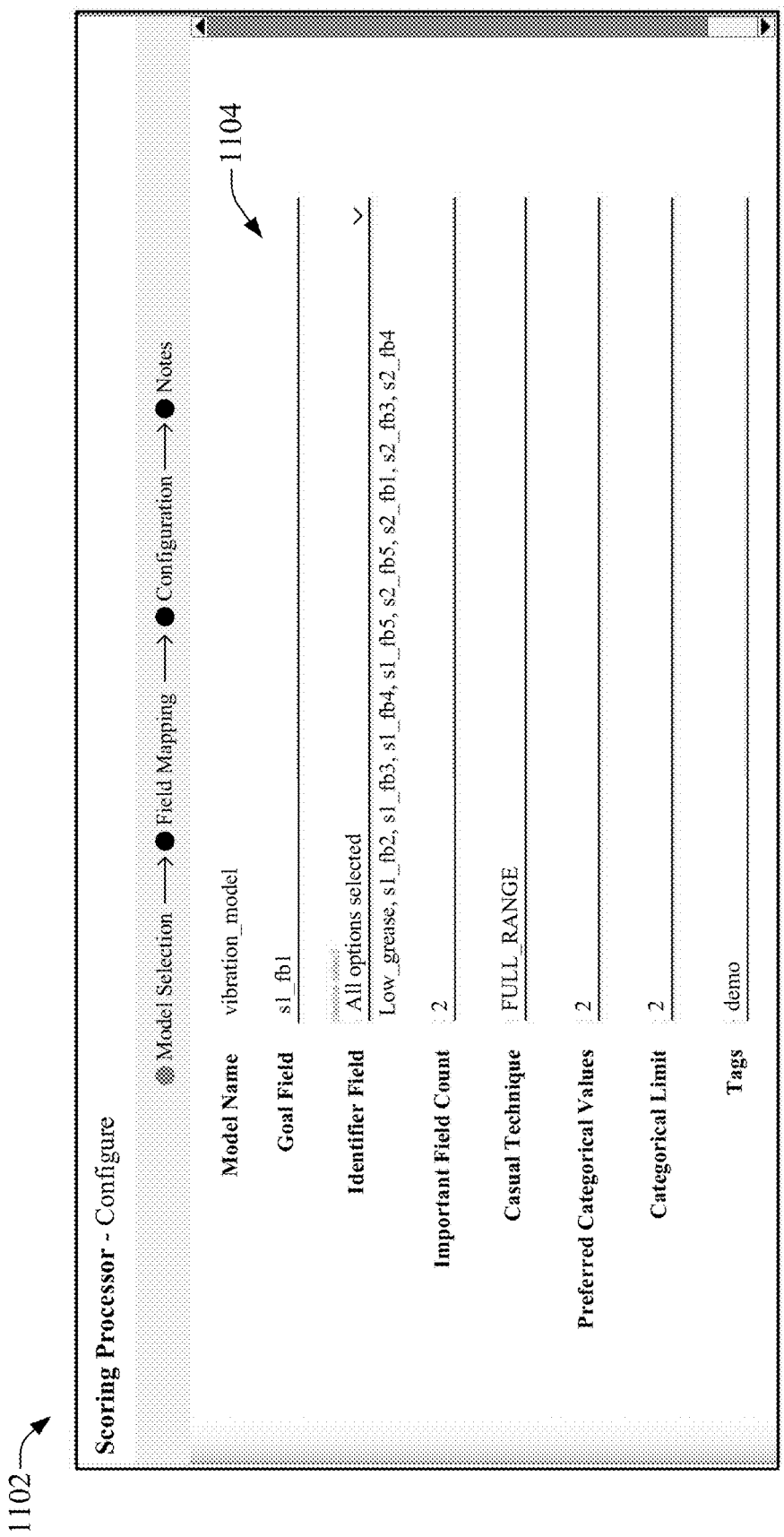
FIG. 11 is an example model configuration interface display that can be generated by a pipeline configuration system and used to set configurable parameters supported by an analytic model.

Some analytic or machine learning (ML) models 702 may have additional parameters that can be set by the user to improve their model algorithm performance. These model-specific parameters can be identified by the model mapping component 208 based on the parsing of the model 702 by the model mapping component 208 and rendered by the user interface component 204 for review and modification by the user. FIG. 11 is an example model configuration interface display 1102 that can be generated by the user interface component 204 and used to set any configurable parameters supported by the model 702. In this example, interface display 1102 renders a set of model configuration fields 1104 that allow the user to enter values of configurable parameters for a selected analytic model 702 (named "vibration model"). These fields 1104 can include, but are not limited to, a Goal field specifying a data item (e.g., "s1_fb1") to be predicted or optimized by the model 702, an Identifier field, a Causal Technique field specifying a type of analysis or an analytic approach to be used by the model 702, or other such model parameters. These parameters are identified by the model mapping component 208 based on the initial parsing of the model 702. The user can interact with these parameter fields to change values of these model parameters as desired. The values of these parameters determine how the model 702 performs its analysis of the data items mapped to the model's input fields.

Although examples discussed above have considered importing and configuring an analytic or machine learning model 702 into the pipeline application 412 as a pipeline component 222, the pipeline configuration system 202 can also allow the user to import other types of external applications into the pipeline application 412 using a similar workflow. These external applications can be substantially any type of application capable of performing processing, transformation, or analysis of incoming data generated by the data source specified by the pipeline design.

Figure 12:
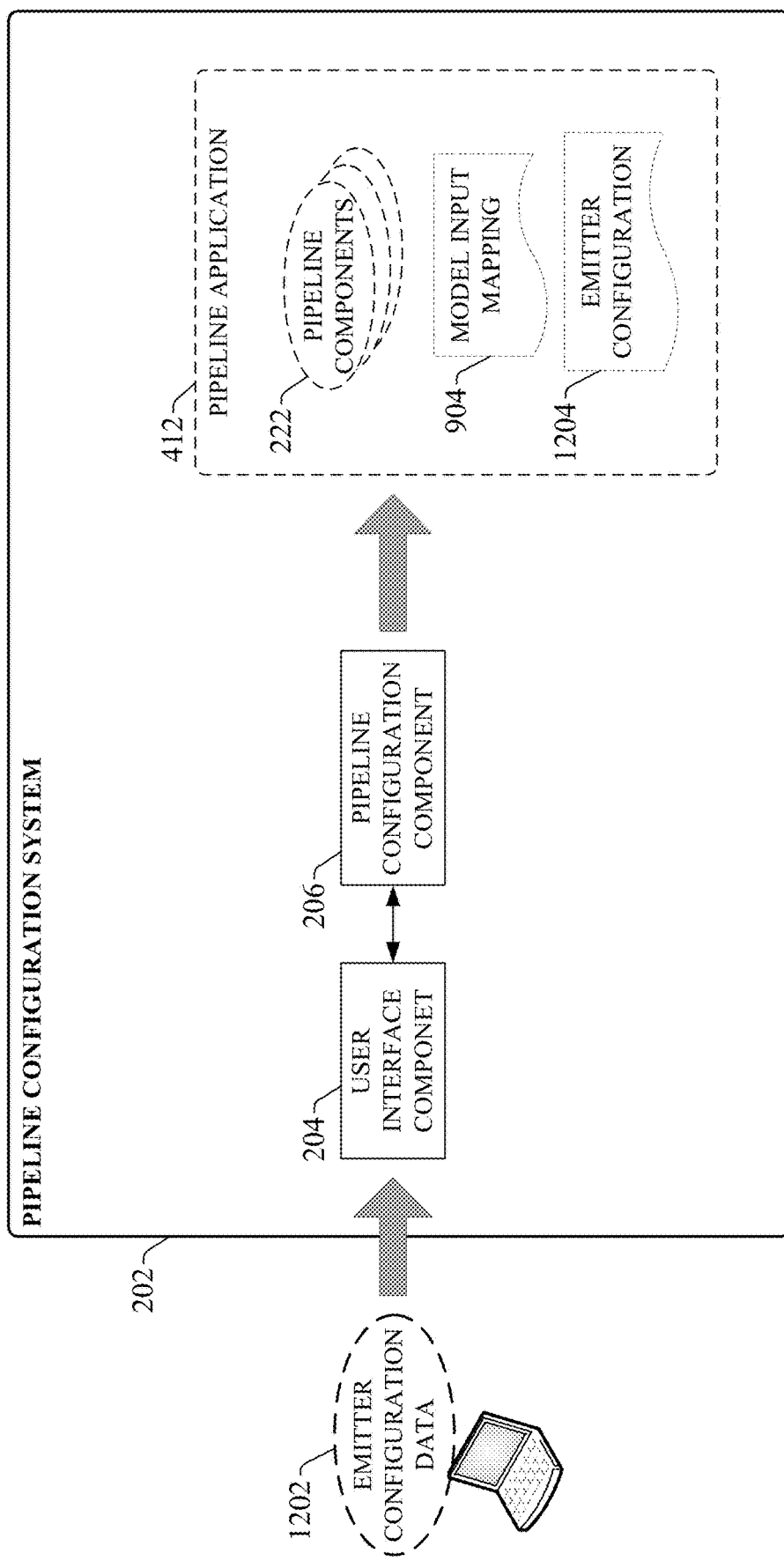
FIG. 12 is a diagram illustrating configuration of an emitter component within a development environment of a pipeline configuration system.

As noted above with reference to FIG. 5, the right-most pipeline component 222 in the pipeline builder section 508 can be an emitter component 222b representing a destination or data sink for data or analytic results generated by the pipeline. This emitter component 222b has associated parameters that can be set by the user to configure which data items or analytic results are to be published to the data sink represented by the emitter component 222b, and where this data is to be sent. FIG. 12 is a diagram illustrating configuration of this emitter component 222b. In response to selection of the emitter component 222b, the user interface component 204 can render an emitter configuration display that allows the user to submit emitter configuration data 1202 that sets the emitter configuration parameters for the pipeline being designed. Based on this emitter configuration data 1202, the pipeline configuration component 206 updates the pipeline application 412 to add an emitter configuration 1204 that will instruct the pipeline nodes how to map the specified data items or analytic results to the data sink represented by the emitter component 222b.

Figure 13:
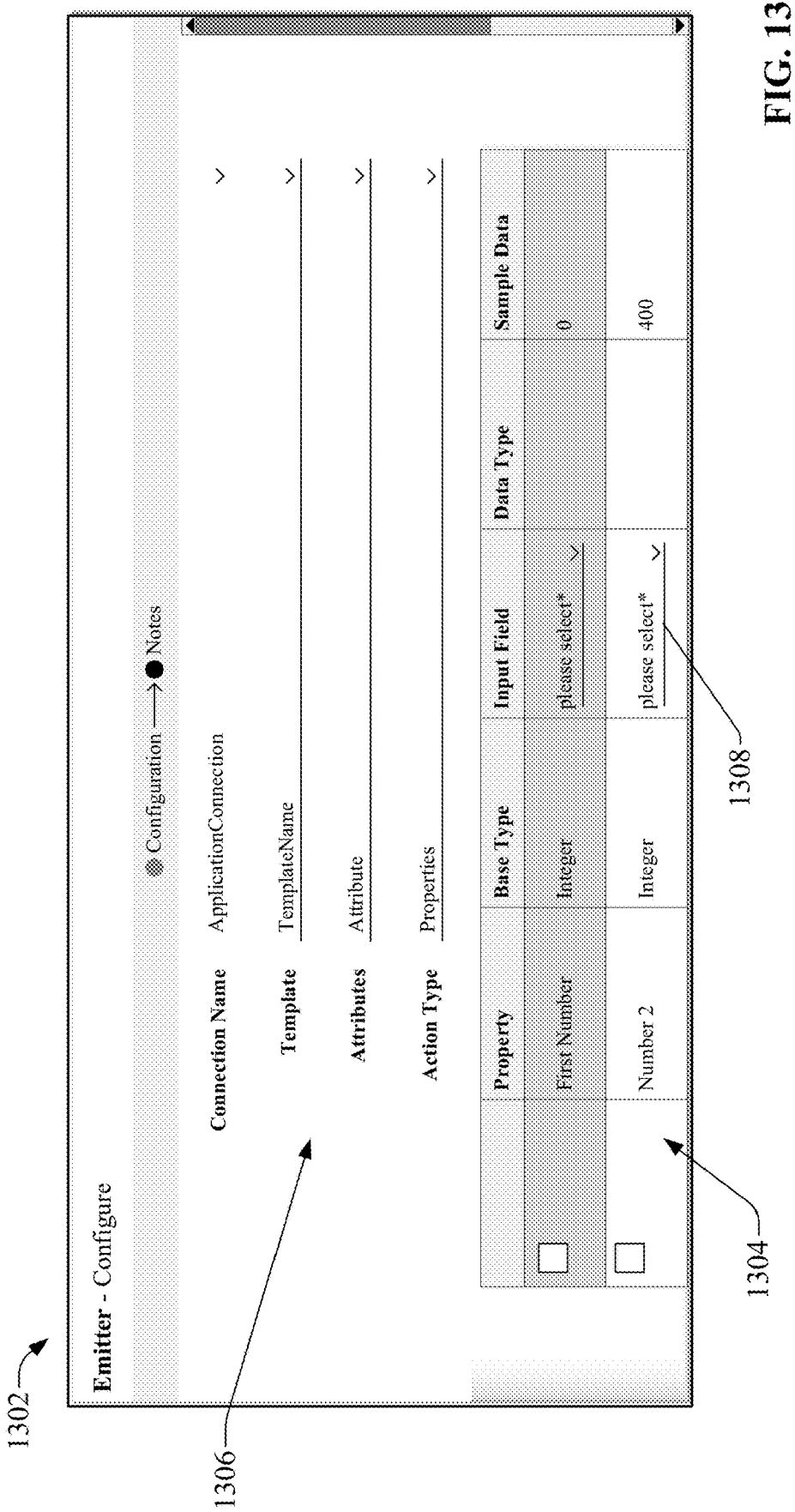
FIG. 13 is an example emitter configuration display that can be used to configure a data pipeline's emitter properties.

FIG. 13 is an example emitter configuration display 1302 that can be used to configure the pipeline's emitter properties. As noted above, this configuration display 1302 can be invoked by selecting the emitter component 222b within the pipeline builder section 508. The pipeline component library 406 can include different types of emitter components 222b representing different types of data sinks to which the pipeline data can be published, including but not limited to a data storage repository (e.g., cloud-based storage, a database, or another type of data storage), a data queue of another data processing or analytic system, a messaging or notification system, a visualization system, an industrial control application that makes adjustments to machine or process control based on analytic results generated by the pipeline, or other such data sinks. The specific emitter parameters rendered on configuration display 1302 may depend on the type of data sink being configured.

In the example depicted in FIG. 13, a first set of configuration parameters 1306 can allow the user to specify a connection path to the data sink entity to which selected items of pipeline output data are to be published. In some scenarios, the data sink entity may be represented as an external object (e.g., a database, an analytic application, a control application, a reporting application, an industrial asset model, etc.) having properties, attributes, or data fields to which data can be written. Parameters 1306 can include connection path information to the data sink and any additional information necessary to identify the entity to which the pipeline data will be published. In some embodiments, if the data sink resides on the same network as the pipeline configuration system 202, or is otherwise accessible to the system 202, the configuration display 1302 can allow the user to browse to and select the data sink entity to set the entity as the target for pipeline data.

Configuration parameters 1306 for the emitter can also include an Action Type field that allows the user to define an action to be taken by the data sink entity based on the pipeline output data, or a specified condition of the output data. For example, if the selected data sink entity is a notification system, the emitter configuration display 1302 can allow the user define a notification action to be taken by the notification system if one or more items of the pipeline data (e.g., one or more outputs of the model 702) satisfied a specified condition. The condition that is to trigger the notification action can also be specified by the user via display 1302. In another example, if the data sink entity is a control application or digital asset model that monitors and controls one or more industrial assets, the user may define a control action that is to be taken by the control application based on values of one or more of the pipeline data items. If the model 702 included in the pipeline is a predictive model, this workflow can allow the user to define a control action to be taken based on a predictive output of the model 702. In still another example, if the selected data sink entity is an analytic application, the emitter configuration display 1302 can allow the user to define an analytic action to be taken on one or more items of output data from the pipeline (e.g., a type of analysis to be applied to the data). Based on the action defined by the user via emitter configuration display 1302, the pipeline will deliver its output data to the specified data sink together with information specifying an action to be performed by the data sink, either on the data or based on the data.

Based on the selected data sink, a mapping section 1304 of the configuration display 1302 can render available properties of the selected data sink to which pipeline data can be written. In the example depicted in FIG. 13, these data sink properties are listed in a web form, with the names of the available properties listed in a Property column and a data type of the respective properties listed in a Base Type column. These editable properties can be discovered by the pipeline configuration component 206 based on parsing the configuration parameters of the selected data sink. For example, if the selected data sink is an analytic or reporting application that receives and processes data inputs, the pipeline configuration component 206 has a priori knowledge and can list the corresponding data inputs in the mapping section 1304. The selected data item may also be an industrial asset model, such as a digital twin or another digital representation of an industrial asset (e.g., an industrial machine, device, automation system, or plant) that is used by an industrial automation system in connection with monitoring and controlling its corresponding asset. Such industrial asset models may include model properties whose values determine certain control actions or strategies deployed by the automation system for the asset. If such an asset model is selected as the pipeline's data sink, the pipeline configuration component 206 can identify the configurable properties defined for the asset model and list these properties in the mapping section 1304.

Each data sink property listed in the mapping section 1304 also has an associated input field 1308 listed in an Input Field column Input fields 1308 can be drop-down windows which are populated with available data items that can be published by the data pipeline to the selected data sink. The available data items listed in the input fields 1308 can be based on the other pipeline configuration information submitted by the user in the previous configuration steps. For example, publishable pipeline data can include any of the data items (e.g., data 302) generated by the pipeline's data source and propagated through the pipeline, as well as analytic results or predictions available from any of the analytic or machine learning models 702 that have been added to the pipeline. Similar to the model mapping workflow described above in connection with FIG. 10, selection of an available pipeline data output in an input field 1308 corresponding to one of the data sink properties configures the pipeline to publish the selected data to that data sink property.

Since the configuration system presents the user with a set of available data sink inputs that are specific to the selected type of data sink, based on the configuration system's a priori knowledge, and allows the user to selectively map pipeline data items or model outputs to these data sink inputs, the resulting pipeline can deliver its data to the selected data sink in a format that is understood by the data sink without the need to configure the data sink itself to interface with the incoming pipeline data.

Since the pipeline emitter configuration allows the user to easily map and egress analytic or machine learning model outputs to specified destinations, including control applications or asset models used in such control applications, the configuration workflow supported by the pipeline configuration system 202 can allow the user to easily configure a closed-loop control architecture in which predictions generated by a predictive machine learning model are used as a basis for automatically updating a control parameter of an industrial control system. In an example scenario, a machine learning model 702 that has been added to the data pipeline may be configured to infer values of one or more control variables—e.g., a gas flow velocity, a valve pressure, a nozzle velocity, etc.—that will optimize a performance metric of an industrial asset (e.g., maintain a specified furnace temperature, minimize an amount of waste produced by a production line, maximize product throughput, minimize machine downtime, minimize energy consumption, minimize emissions, etc.) based on analysis of various monitored variables fed to the pipeline as incoming data 302 (e.g., ambient temperature, current gas flow velocity, etc.). Using the design workflow discussed herein, the user can design the pipeline to map these predicted control variable values from the model 702 to the control system that monitors and controls the relevant industrial asset; e.g., by mapping the predicted values generated by the model 702 to their corresponding data tags in an industrial controller, or to corresponding fields of a digital asset model, thereby altering control of the asset in accordance with the model to optimize the performance metric.

After the user has completed the design of pipeline application 412 using the general workflow discussed above, validation tools supported by the pipeline configuration system 202 can be used to validate the proposed pipeline design. These validation tools can be applied locally on the pipeline configuration system 202 before the pipeline application 412 is deployed and executed on the actual pipeline architecture. In various embodiments, this validation process can analyze the pipeline application 412 to verify that all model mapping and data sink mapping definitions are valid (e.g., that the mappings include no data type mismatches), verify that all necessary input fields of every model 702 that has been integrated into the pipeline have been mapped, or perform other such validations.

Figure 14:
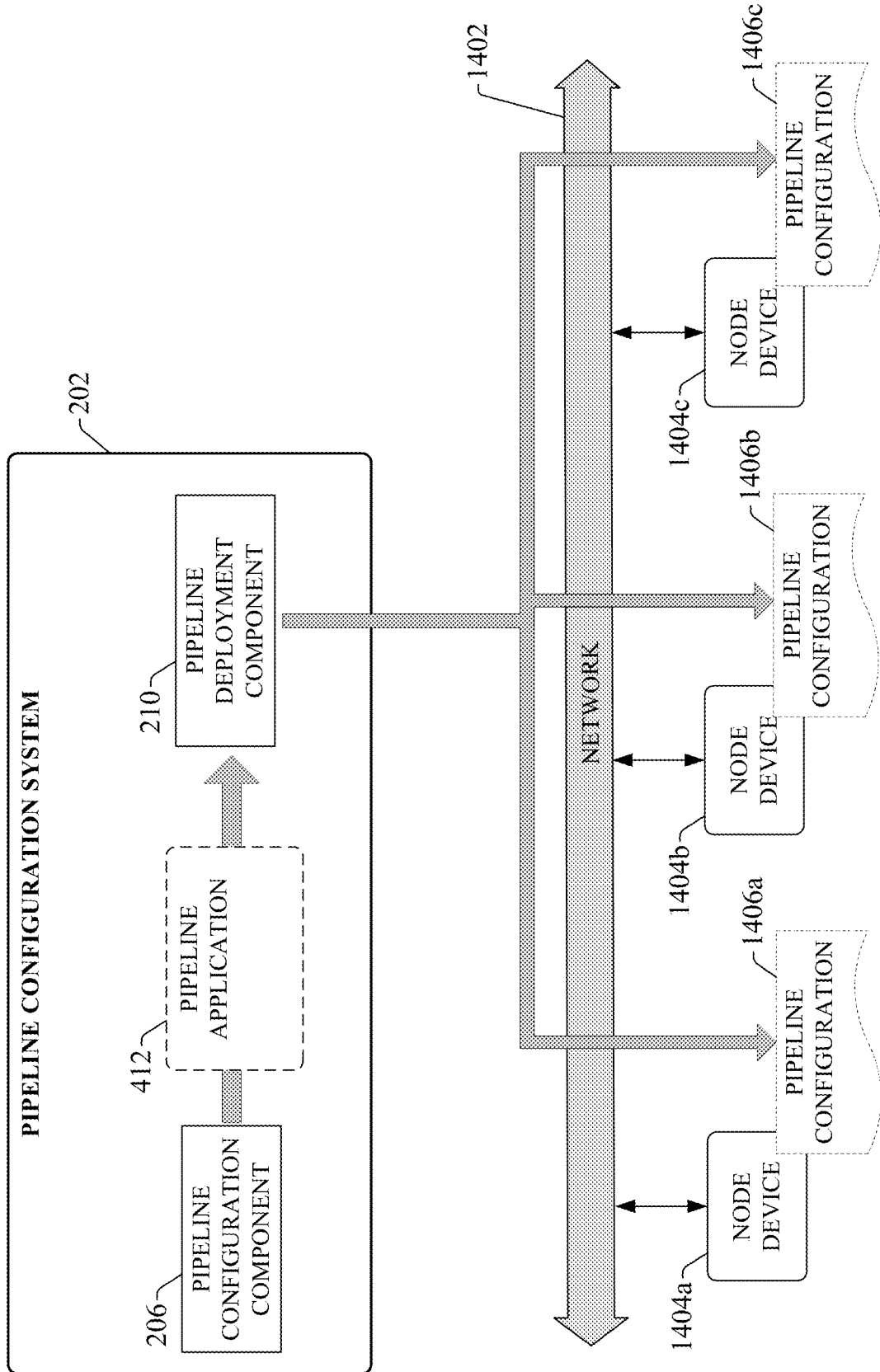
FIG. 14 is a diagram illustrating deployment of a pipeline application by a pipeline configuration system.

Once the pipeline application 412 has been validated, the application 412 can be deployed to one or more pipeline nodes for execution. FIG. 14 is a diagram illustrating deployment of the pipeline application 412. Pipeline deployment component 210 can compile or otherwise translate a completed pipeline application 412 into one or more executable pipeline configuration files 1406 that can be stored and executed on one node or a cluster of nodes 1404 that make up the data pipeline architecture. These one or more nodes 1404 can be execution cluster nodes, server devices, microservices executing on respective computer hardware platforms, or other such processing elements. In general, the pipeline application 412 can be executed on a scalable parallelized runtime engine that runs on a cluster of hardware nodes (e.g., nodes 1404), or may run on a single such node. Pipeline deployment component 210 can deploy the compiled pipeline application 412 to these node devices 1404 over a shared public or private network 1402. Alternatively, if the pipeline configuration system 202 is implemented on a hardware platform that will act as a pipeline node, the pipeline application 412 need not be deployed to an external node 1404, but rather can be complied and executed on the pipeline configuration system's own hardware platform.

Figure 15:
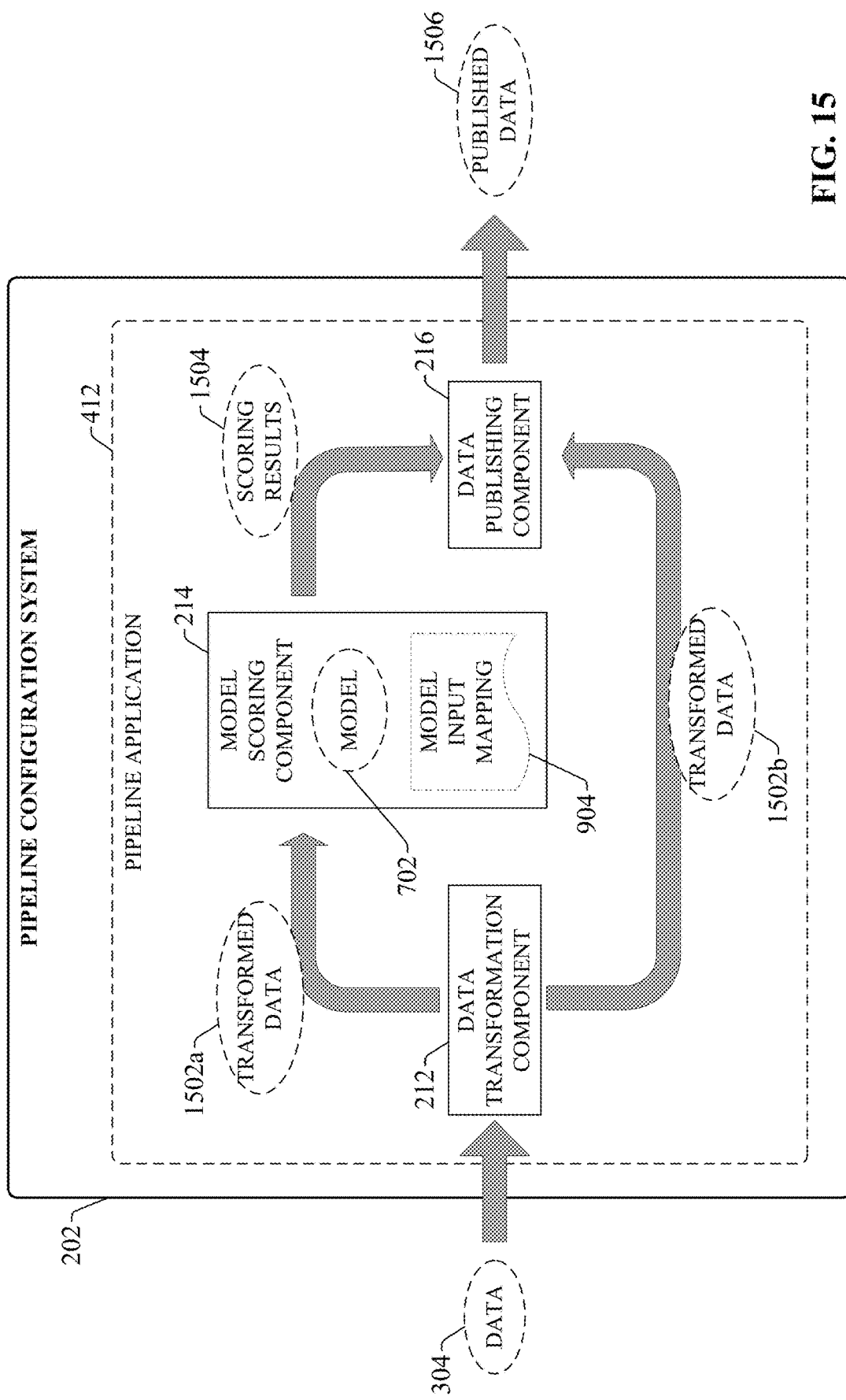
FIG. 15 is a diagram illustrating execution of a pipeline application using local processing resources of a pipeline configuration system.

Execution of the pipeline application 412 on a computing platform—e.g., on nodes 1404 or using the pipeline configuration system's local processing resources—causes the computing platform to collect, process, analyze, and publish data in accordance with the pipeline design defined by the application 412. FIG. 15 is a diagram illustrating execution of the pipeline application 412 using local processing resources of the pipeline configuration system 202. The pipeline application 412 can implement a data transformation component 212, a model scoring component 214, and a data publishing component 216 that carry out pipeline functionality defined by the application 412. During operation, data 302 is received from the one or more data sources defined by the application 412 and transformed by the data transformation component 212 to yield transformed data 1502. In this regard, the data transformation component 212 can parse the incoming data 302—which may be either structured or unstructured data—to determine the schema of the data 302, and transform the data in accordance with the data preparation component 222c that had been added to the pipeline design (see FIG. 6). In some configurations, the data transformation component 212 can identify the data items contained in the incoming data 302—including the names of the data items, their data types, and their corresponding values—and generate, as the transformed data 1502, a CSV file that stores this data in a format that can be understood and processed by downstream pipeline processing elements.

If the pipeline application 412 includes an analytic or machine learning model 702 that had been added during the pipeline configuration process (e.g., using the workflow discussed above in connection with FIGS. 7-11), a model scoring component 214 can pass a selected subset of the transformed data 1502a to the model 702 for processing. The items of transformed data 1502a passed to the model 702, and the model input fields to which each data item is provided, are specified by the model input mapping 904 that had been entered by the user as discussed above in connection with FIGS. 9 and 10. The model scoring component 214 executes the model 702 on the mapped subset of the transformed data 1502a to yield a model output, or scoring results 1504. The type or format of the scoring results 1504 generated by the model 702 depends on the type of analysis for which the model 702 is designed, and may be a prediction regarding a future operation or status of an industrial system (e.g., an expected time-to-failure of an industrial machine or device, an predicted energy consumption by a machine, etc.), a value of one or more control parameters expected to optimize a selected performance metric, a classification, or other such analytic results.

The pipeline configuration component 206 can be configured to render model scoring results 1504 for a user's review while the pipeline is executing. FIG. 16 is an example model scoring display 1602 that can be rendered by the user interface component 204 and used to visualize scoring results 1504 and other information relating to application of the analytic model 702 to incoming data 302. Display 1602 renders values of the incoming data 302 (read from the transformed data 1502a, which may be a CSV file or another suitable format understandable by the model scoring component 214) as well as scoring results generated by the model scoring component 214 based on application of the model 702 to the incoming data. The example depicted in FIG. 16 renders scoring results for a predictive model, and therefore includes a column displaying predictive scores for two variables of interest ("s1_fb1" and "s1_fb1_mo"). Display 1602 can also render other information regarding the scoring, including weights applied to the model's various data fields. The model fields and results rendered by display 1602 depend on the chosen analytic model 702 and its configuration, as well as the aspect of the industrial process that is to be predicted by the model. Model scoring display 1602 serves as a preview panel for the final output data before the data leaves the platform via the emitter.

In some scenarios, one or more of the models 702 added to the pipeline application 412 may be imported and executed locally on the pipeline configuration system 202 or remote nodes on which the pipeline application 412 executes. In such embodiments, addition of the model 702 to the pipeline application 412, as described above in connection with FIGS. 7 and 8, can cause the selected model 702 to be imported into the configuration system 202 and integrated directly into the pipeline application 412. Alternatively, if a model 702 from an external application 708 is imported to the pipeline application 412 (see FIG. 7), incoming data from the data source can be mapped to the external model 702 imported as described above, but the model 702 can execute on the external application 708 without being imported directly into the pipeline application 412 or deployed to the nodes 1404. During execution of the data pipeline in such scenarios, the external application 708 can be made a part of the data pipeline, such that the mapped transformed data 1502a is sent to the external application 708 for processing by the application's analytic model 702, and the resulting scoring results 1504 are returned by the external application 708 to the pipeline configuration system 202 (or node 1404) for traversal through the rest of the data pipeline and publishing to the data sink.

Although the present example depicts the model scoring display 1602 can as being viewed during operation of the pipeline after the pipeline application 412 has been deployed, display 1602 can also be invoked during validation of the pipeline application 412 before the pipeline is deployed in order to verify the scoring results 1504 generated by the model 702, as well as to confirm that incoming data items have been correctly mapped to the model's input fields. For example, during validation of the pipeline application 412, the user may link the pipeline application 412 to a repository of stored historical data, or to the live data source, and execute the model on data obtained from these sources. The user can then invoke display 1602 to view the scoring results 1504 generated by applying the model to this test data set. In this way, the user can verify that the model is generated expected results prior to deploying the application 412.

Returning to FIG. 15, the scoring results 1504 and transformed data 1502b are conveyed to the data publishing component 216, which is configured to publish the scoring results 1504 and the transformed data to one or more data sinks in accordance with the emitter configuration 1204 submitted by the user (as discussed above in connection with FIGS. 12 and 13). Data publishing component 216 publishes the scoring results 1504 and items of transformed data 1502b 1502b—together with any action instructions pre-specified by the user via emitter configuration display 1306—as published data 1506, which is mapped to the data sink in accordance with the emitter configuration. As discussed above, the data publishing component 216 can publish the data 1506 to substantially any type of data sink. For example, the data publishing component 216 may map selected scoring results 1504 and items of transformed data 1502b to corresponding attributes of a digital asset model used in connection with monitoring and controlling a corresponding industrial asset, thereby altering control of the asset based on predictions or control optimization strategies generated by the model 702. In another example scenario, the data publishing component 216 may map the published data 1506 to control parameters of an industrial control program (e.g., a ladder logic program executing on a programmable logic controller) to similarly effect a control modification based on the scoring results 1504. Data publishing component 216 may also send the published data 1506 to other types of data sinks, including but not limited to external applications (e.g., analytic or reporting applications), data historians, cloud-based archival storage, notification systems, visualization systems such as HMI applications, or other such data sinks.

Embodiments of the pipeline configuration system 202 described herein can simplify the process of designing and deploying a data pipeline by providing an intuitive visual workflow for adding and configuring channels, connectors, data processors, analytic models, and emitters. By guiding the user through the steps of creating a pipeline—including linking to data sources, adding data processors and analytic models, and defining actions to be taken based on analytic results—the configuration system 202 can assist users with relatively little training in pipeline development in designing and deploying data pipelines.

Figure 17A:
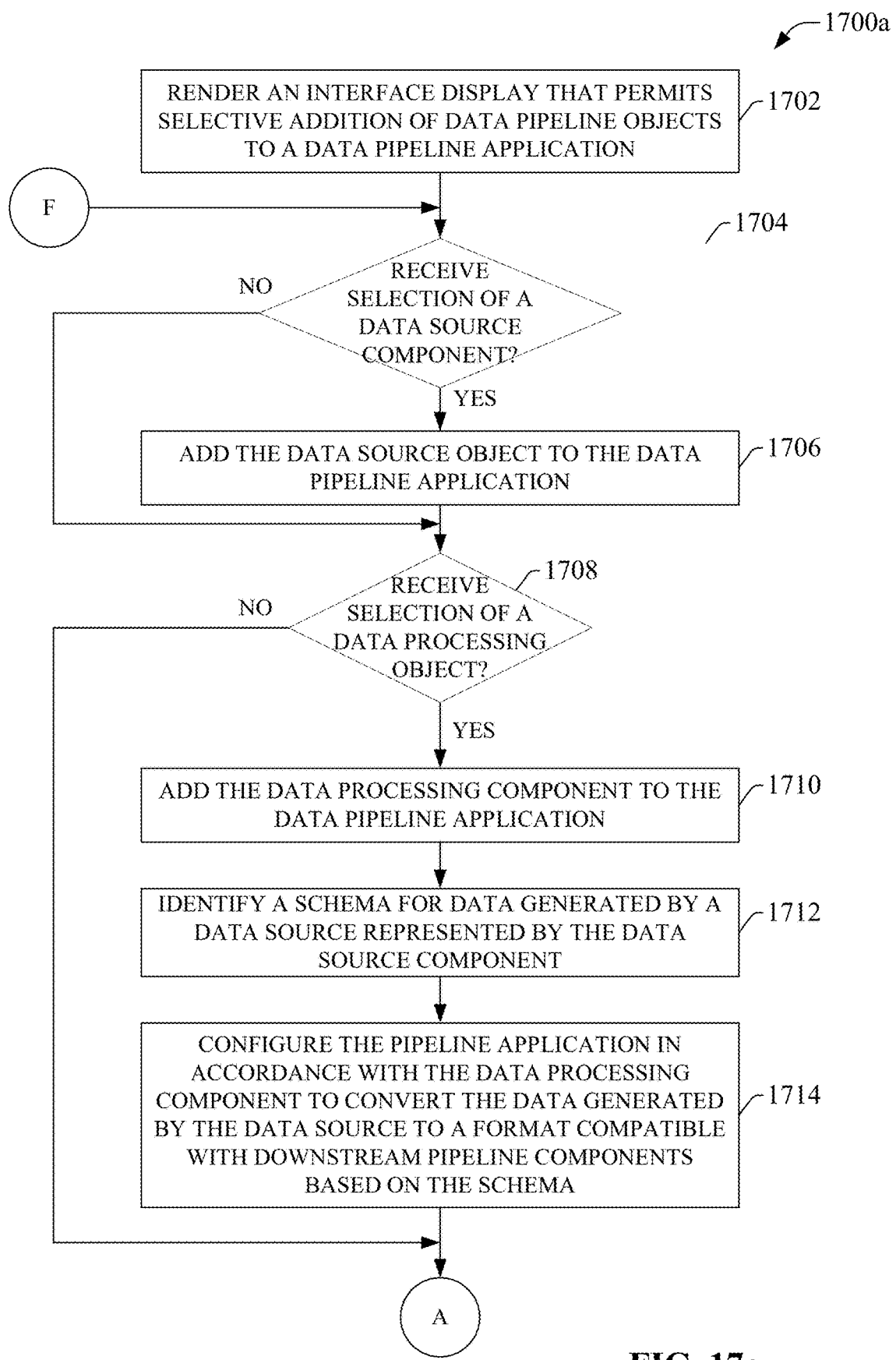
FIG. 17a is a flowchart of a first part of an example methodology for developing an industrial data pipeline application.
Figure 17B:
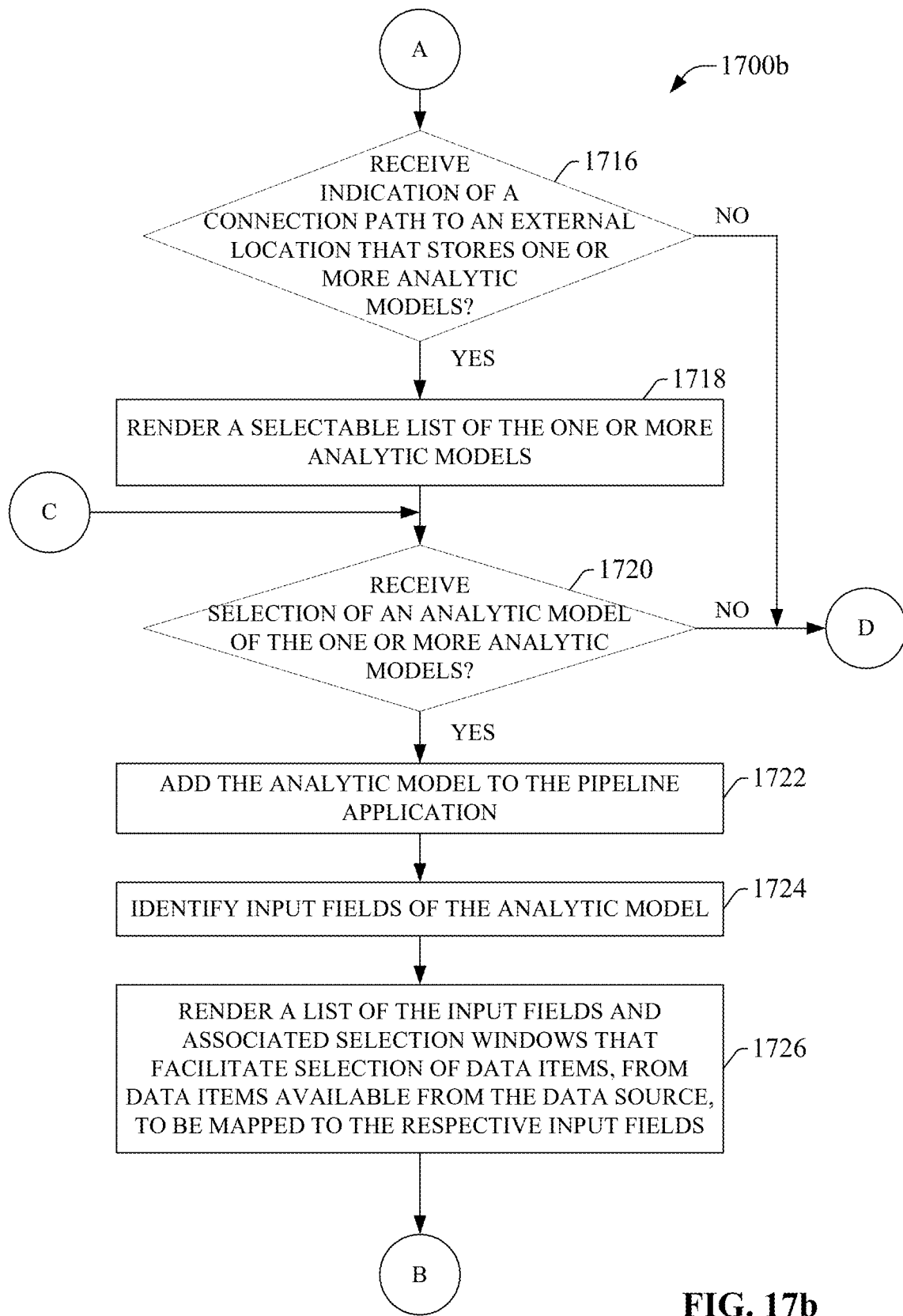
FIG. 17b is a flowchart of a second part of the example methodology for developing an industrial data pipeline application.
Figure 17C:
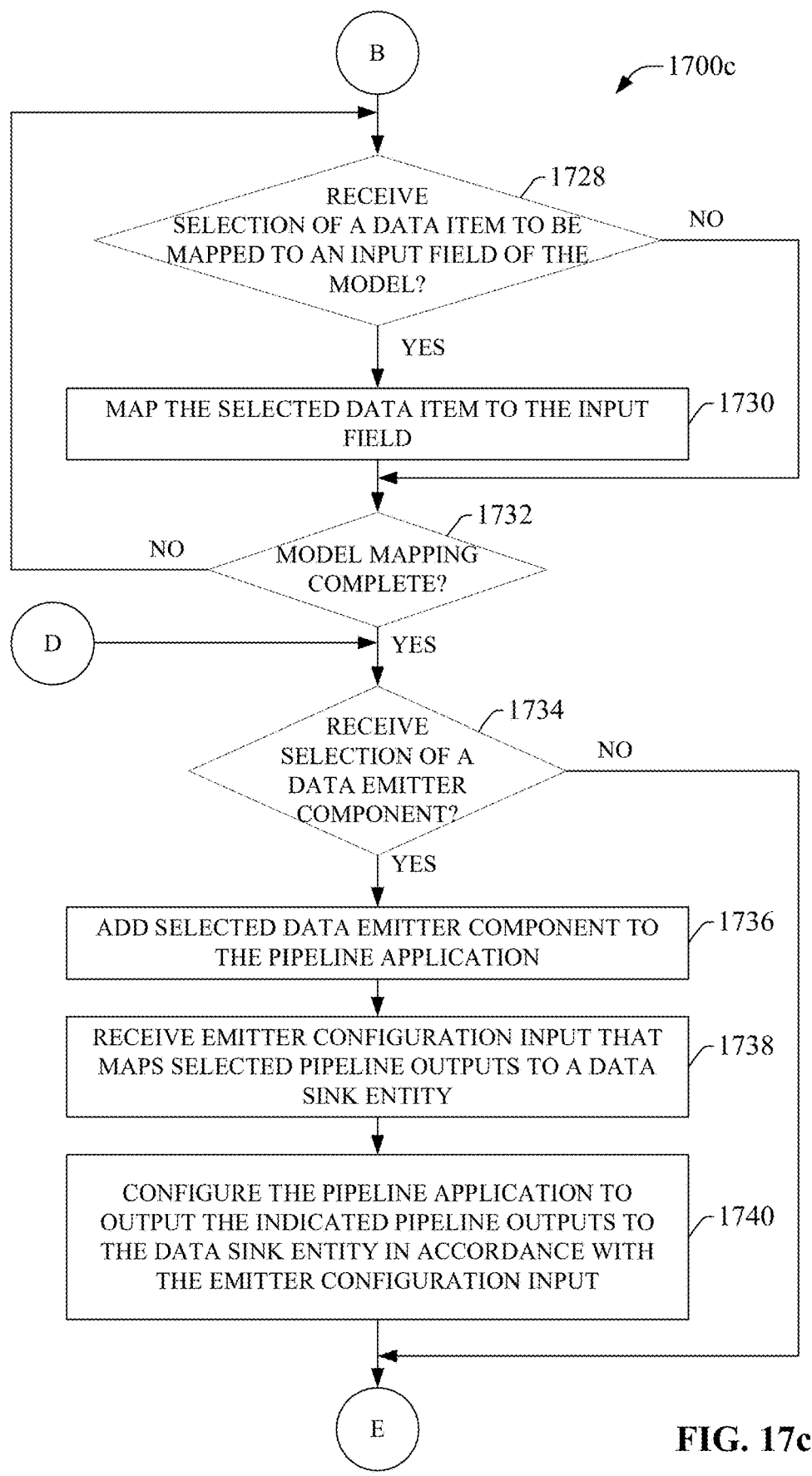
FIG. 17c is a flowchart of a third part of the example methodology for developing an industrial data pipeline application.
Figure 17D:
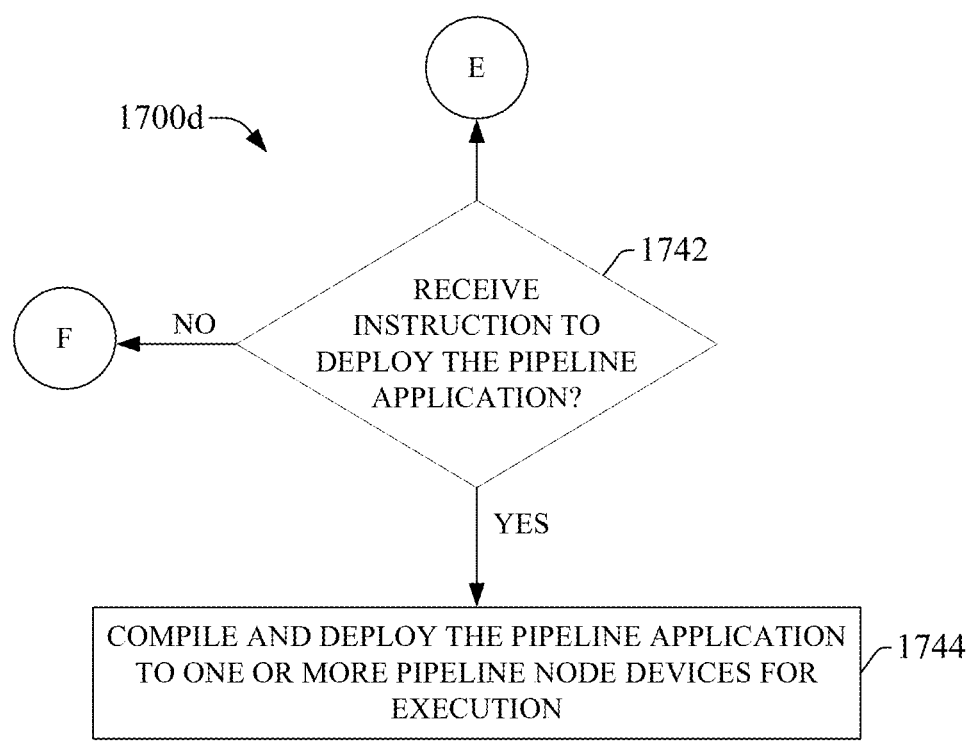
FIG. 17d is a flowchart of a fourth part of the example methodology for developing an industrial data pipeline application.
Figure 18:
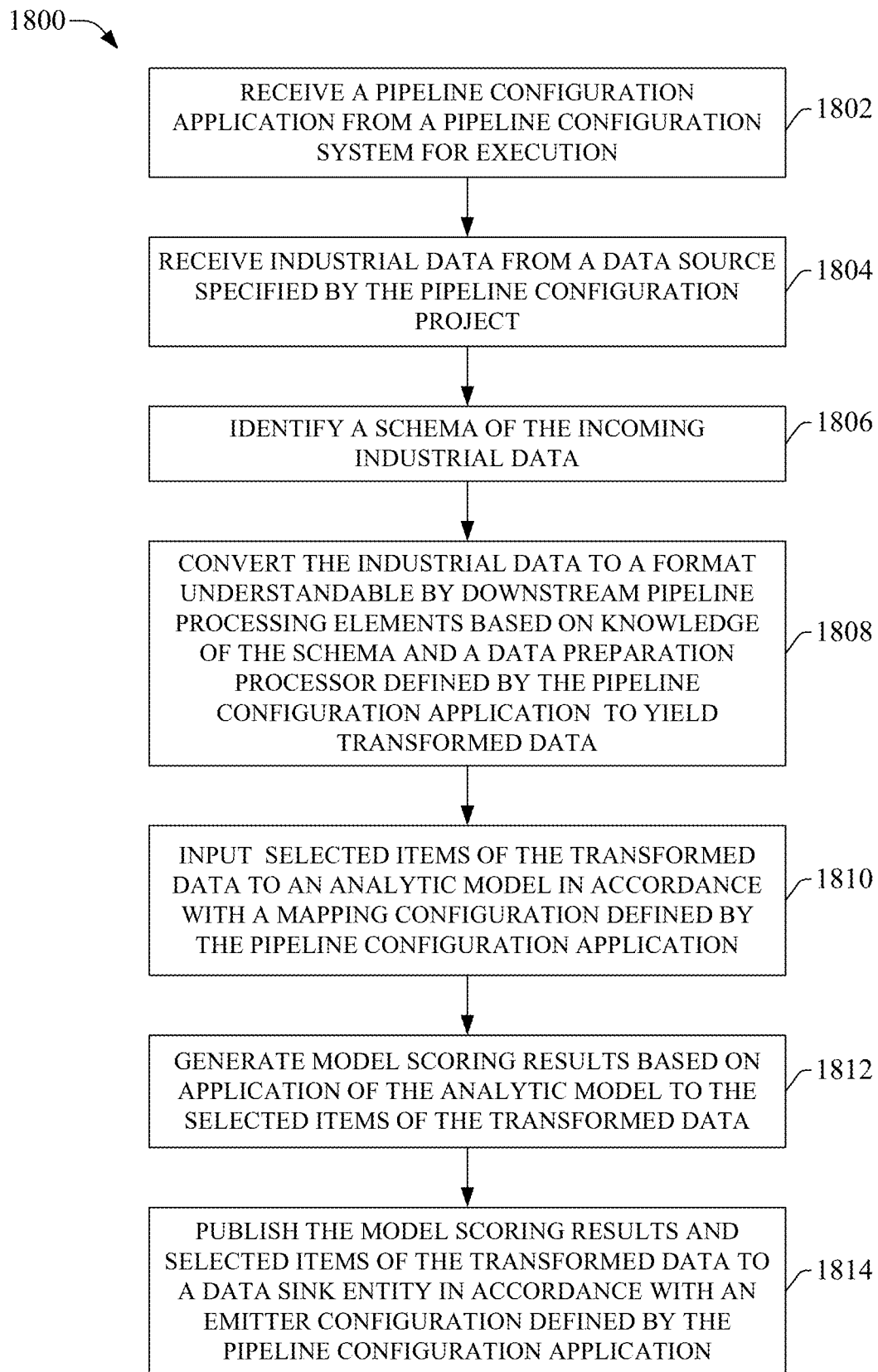
FIG. 18 is a flowchart of an example methodology for executing a data pipeline application.

FIGS. 17a-18 illustrate example methodologies in accordance with one or more embodiments of the subject application. While, for purposes of simplicity of explanation, the methodologies shown herein is shown and described as a series of acts, it is to be understood and appreciated that the subject innovation is not limited by the order of acts, as some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the innovation. Furthermore, interaction diagram(s) may represent methodologies, or methods, in accordance with the subject disclosure when disparate entities enact disparate portions of the methodologies. Further yet, two or more of the disclosed example methods can be implemented in combination with each other, to accomplish one or more features or advantages described herein.

FIG. 17a illustrates a first part of an example methodology 1700a for developing an industrial data pipeline application. Initially, at 1702, an interface display is rendered that permits selective addition of data pipeline components to a data pipeline application. This display can be rendered by a pipeline configuration system, which is configured to guide a user through a visual pipeline development workflow and to create a pipeline application that can be compiled, deployed, and executed to facilitate implementation of a data pipeline. At 1704, a determination is made as to whether a data source component is received via interaction with the interface display rendered at step 1702. This data source component can be selected from a library of pipeline components accessible via the interface display, and can represent a specific type of data source (e.g., a file system, an industrial device, an application, etc.). If a data source component is selected (YES at step 1704), the methodology proceeds to 1706, where the selected data source component is added to the data pipeline application in progress. Alternatively, if no data source component is selected (NO at step 1704), the methodology proceeds to step 1708.

At 1708, a determination is made as to whether selection of a data processing component is received via interaction with the interface display. The data processing component can also be selected from the library of pipeline components, and can represent a selected type of processing or data manipulation to be performed on data from the data source added at step 1706, including but not limited to a specified type of data formatting, a data conversion, a calculation, addition of metadata, or other such data processing. The present example assumes that the selected data processing component is configured to parse incoming data from the data source to determine the data's schema, and to convert the incoming data to a format understandable by downstream pipeline components. If selection of a data processing component is received (YES at step 1708), the methodology proceeds to step 1710, where the selected data processing component is added to the data pipeline application. At 1712, a schema of data generated by the data source represented by the data source component added at step 1706 is identified. At 1714, the pipeline application is further configured, in accordance with the data processing component, to convert the data generated by the data source to a format compatible with downstream pipeline components (e.g., a CSV file), where this conversion is based on the identified schema. If no selection of a data processing component is received (NO at step 1708) the methodology skips steps 1710-1714.

The methodology then proceeds to the second part 1700b illustrated in FIG. 17b. At 1716, a determination is made as to whether an indication of a connection path to an external location that stores one or more analytic models is received via interaction with the interface display (e.g., if a user has entered a connection path or has browsed to the external location on which the models are stored). If such a connection path is specified (YES at step 1716), the methodology proceeds to step 1718, where a selectable list of the one or more analytic models are rendered on the interface display. This list is populated based on the analytic models discovered at the external location identified by the communication path. At 1720, a determination is made as to whether selection of an analytic model, of the listed analytic models, is received via interaction with the interface display. If such a model selection is received (YES at step 1720), the methodology proceeds to step 1722, where the analytic model selected at step 1720 is added to the pipeline application.

Initially, the input fields of this selected analytic model may not be mapped to specific incoming data items, as in the case of an analytic model whose input fields were defined generically without knowledge of the naming conventions of the corresponding data items of a specific data source or industrial application. Accordingly, at 1724, the data fields of the input fields of the selected analytic model are identified. At 1726, a list of the input fields identified at step 1724 are rendered on the interface display, together with associated selection windows that facilitate selection of data items, from data items available from the data source, that are to be mapped to the respective input fields of the model. The data items made selectable via the selection windows can be based on the data items discovered in the data source represented by the data source component added at step 1706. In some scenarios, these data items may be discovered from a converted or transformed version of the data source's data items generated by the data processing component added at step 1710. The methodology then proceeds to the third part 1700*c* illustrated in FIG. 17*c*.

At 1728, a determination is made as to whether selection of a data item to be mapped to an input field of the model is received via interaction with one of the selection windows rendered at step 1726. If such a selection is received (YES at step 1728), the methodology proceeds to step 1730, where the data item selected at step 1728 is mapped to the model input field corresponding to the selection window in which the data item was selected. At 1732, a determination is made as to whether model mapping is complete. Model mapping may considered complete when all input fields defined for the model have been mapped to a data item using steps 1728 and 1730. If model mapping is not complete (NO at step 1732), the methodology returns to step 1728, and steps 1728 and 1730 are repeated for another input field. Alternatively, if model mapping is complete (YES at step 1732), or if no model had been selected at step 1720 (NO at step 1720), the methodology proceeds to step 1734.

At 1734, a determination is made as to whether selection of a data emitter component is received via interaction with the display interface. The data emitter component can be selected from the component library made available by the pipeline configuration system, and can represent a specified type of data sink or destination to which output data from the pipeline is to be published (e.g., a data repository, an analytic or reporting application, a messaging or notification system, an industrial control system, a digital asset model or digital twin of an industrial system, etc.). If such a data emitter component is selected (YES at step 1734), the methodology proceeds to step 1736, where the data emitter component selected at step 1734 is added to the pipeline application. At 1738, emitter configuration input is received via interaction with the interface display. This emitter configuration input maps selected items of pipeline output data to a data sink entity represented by the selected data emitter component. Pipeline data that can be mapped in this manner can include raw or processed data from the data source as well as analytic results generated by any models added to the pipeline application using steps 1716-1732. At 1740, the pipeline application is configured to output the indicated pipeline output data to the data sink entity in accordance with the emitter configuration input received at step 1738. If no selection of a data emitter component is received (NO at step 1734), steps 1736-1740 are skipped. The methodology then proceeds to the fourth part 1700*d* illustrated in FIG. 17*d*.

At 1742, a determination is made as to whether an instruction to deploy the resulting pipeline application is received. If no such instruction is received (NO at step 1742), the methodology returns to step 1704, and steps 1704-1742 are repeated to allow the user to add and configure additional pipeline components or models as desired. Alternatively, if an instruction to deploy the pipeline is received (YES at step 1742), the methodology proceeds to step 1744, where the pipeline application created using the preceding steps is compiled and deployed to one or more data pipeline nodes for execution. Alternatively, the compiled pipeline application may execute on the same hardware platform on which the pipeline configuration system executes.

FIG. 18 illustrates an example methodology 1800 for executing an industrial data pipeline application. Initially, at 1802, a pipeline application is received from a pipeline configuration system for execution. The pipeline application can be generated using the methodology described above in connection with FIGS. 17*a*-17*d*. At 1804, data from a data source specified by the pipeline application is received. The data retrieved from the data source can be specified by data source configuration information that is part of the application. At 1806, a schema of the incoming data received at step 1804 is identified. In various scenarios, the data may be received in a structured or unstructured format that is not compatible with subsequent pipeline processing. At 1808, the incoming data is converted to a format understandable by downstream pipeline processing element based on knowledge of the incoming data's schema and data preparation processing defined by the pipeline application. This conversion yields transformed data.

At 1810, selected items of the transformed data are input to an analytic model in accordance with a model mapping configuration defined by the pipeline application. At 1812, models scoring results are generated based on application of the analytic model to the selected items of the transformed data input at step 1810. In some embodiments, the analytic model may execute on an application that is external to the hardware platform on which the pipeline application executes. In such configurations, the items of transformed data can be sent to this external application for processing by the model, and the model scoring results can be returned to the data pipeline for further pipeline processing. Alternatively, the model may execute on the same hardware platform as the pipeline application, and the model scoring processing can be performed locally.

At 1814, at least a subset of the model scoring results generated at step 1812 and specified items of the transformed data generated at step 1808 are published to a data sink entity in accordance with an emitter configuration defined by the pipeline application. This data sink entity can be, but is not limited to, a data repository (e.g., cloud-based archival storage), an industrial control system, a digital asset model or digital twin of an industrial system used to facilitate control of an industrial asset, a reporting or visualization application, an analytic application, or other such data destinations.

Embodiments, systems, and components described herein, as well as control systems and automation environments in which various aspects set forth in the subject specification can be carried out, can include computer or network components such as servers, clients, programmable logic controllers (PLCs), automation controllers, communications modules, mobile computers, on-board computers for mobile vehicles, wireless components, control components and so forth which are capable of interacting across a network. Computers and servers include one or more processors—electronic integrated circuits that perform logic operations employing electric signals—configured to execute instructions stored in media such as random access memory (RAM), read only memory (ROM), a hard drives, as well as removable memory devices, which can include memory sticks, memory cards, flash drives, external hard drives, and so on.

Similarly, the term PLC or automation controller as used herein can include functionality that can be shared across multiple components, systems, and/or networks. As an example, one or more PLCs or automation controllers can communicate and cooperate with various network devices across the network. This can include substantially any type of control, communications module, computer, Input/Output (I/O) device, sensor, actuator, and human machine interface (HMI) that communicate via the network, which includes control, automation, and/or public networks. The PLC or automation controller can also communicate to and control various other devices such as standard or safety-rated I/O modules including analog, digital, programmed/intelligent I/O modules, other programmable controllers, communications modules, sensors, actuators, output devices, and the like.

The network can include public networks such as the internet, intranets, and automation networks such as control and information protocol (CIP) networks including DeviceNet, ControlNet, safety networks, and Ethernet/IP. Other networks include Ethernet, DH/DH+, Remote I/O, Fieldbus, Modbus, Profibus, CAN, wireless networks, serial protocols, and so forth. In addition, the network devices can include various possibilities (hardware and/or software components). These include components such as switches with virtual local area network (VLAN) capability, LANs, WANs, proxies, gateways, routers, firewalls, virtual private network (VPN) devices, servers, clients, computers, configuration tools, monitoring tools, and/or other devices.

Figure 19:
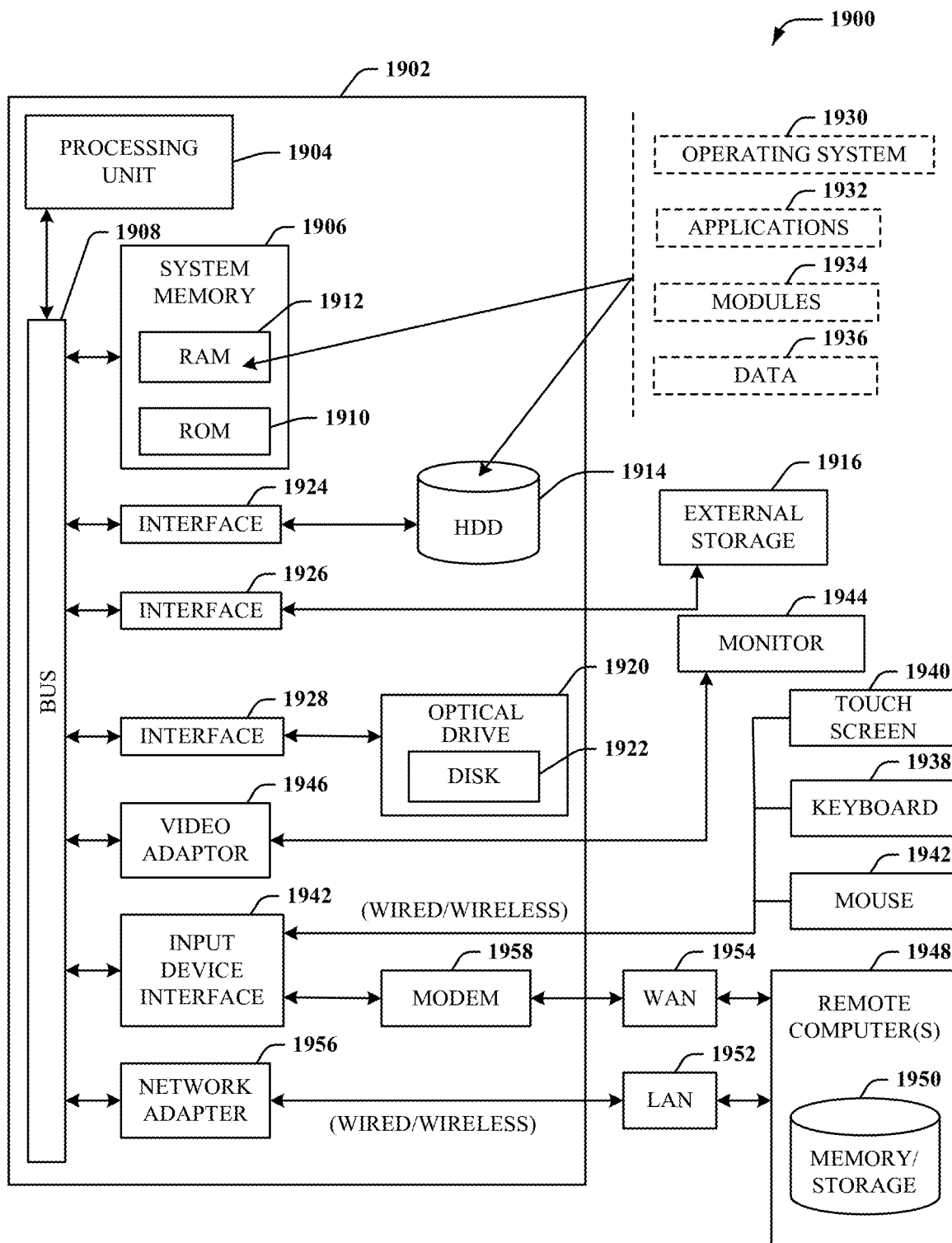
FIG. 19 is an example computing environment.
Figure 20:
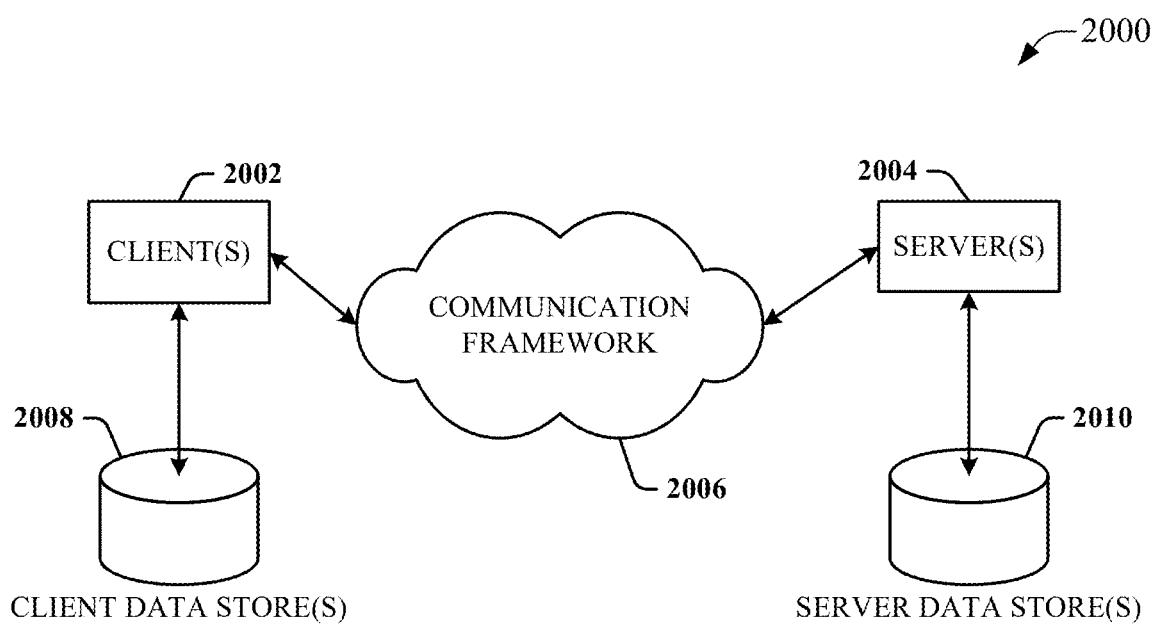
FIG. 20 is an example networking environment.

In order to provide a context for the various aspects of the disclosed subject matter, FIGS. 19 and 20 as well as the following discussion are intended to provide a brief, general description of a suitable environment in which the various aspects of the disclosed subject matter may be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, Internet of Things (IoT) devices, distributed computing systems, as well as personal computers, hand-held computing devices, microprocessor-based or programmable consumer electronics, and the like, each of which can be operatively coupled to one or more associated devices.

The illustrated embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 19 the example environment 1900 for implementing various embodiments of the aspects described herein includes a computer 1902, the computer 1902 including a processing unit 1904, a system memory 1906 and a system bus 1908. The system bus 1908 couples system components including, but not limited to, the system memory 1906 to the processing unit 1904. The processing unit 1904 can be any of various commercially available processors. Dual microprocessors and other multi-processor architectures can also be employed as the processing unit 1904.

The system bus 1908 can be any of several types of bus structure that can further interconnect to a memory bus (with or without a memory controller), a peripheral bus, and a local bus using any of a variety of commercially available bus architectures. The system memory 1906 includes ROM 1910 and RAM 1912. A basic input/output system (BIOS)

can be stored in a non-volatile memory such as ROM, erasable programmable read only memory (EPROM), EEPROM, which BIOS contains the basic routines that help to transfer information between elements within the computer 1902, such as during startup. The RAM 1912 can also include a high-speed RAM such as static RAM for caching data.

The computer 1902 further includes an internal hard disk drive (HDD) 1914 (e.g., EIDE, SATA), one or more external storage devices 1916 (e.g., a magnetic floppy disk drive (FDD) 1916, a memory stick or flash drive reader, a memory card reader, etc.) and an optical disk drive 1920 (e.g., which can read or write from a CD-ROM disc, a DVD, a BD, etc.). While the internal HDD 1914 is illustrated as located within the computer 1902, the internal HDD 1914 can also be configured for external use in a suitable chassis (not shown). Additionally, while not shown in environment 1900, a solid state drive (SSD) could be used in addition to, or in place of, an HDD 1914. The HDD 1914, external storage device(s) 1916 and optical disk drive 1920 can be connected to the system bus 1908 by an HDD interface 1924, an external storage interface 1926 and an optical drive interface 1928, respectively. The interface 1924 for external drive implementations can include at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 1902, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1912, including an operating system 1930, one or more application programs 1932, other program modules 1934 and program data 1936. All or portions of the operating system, applications, modules, and/or data can also be cached in the RAM 1912. The systems and methods described herein can be implemented utilizing various commercially available operating systems or combinations of operating systems.

Computer 1902 can optionally comprise emulation technologies. For example, a hypervisor (not shown) or other intermediary can emulate a hardware environment for operating system 1930, and the emulated hardware can optionally be different from the hardware illustrated in FIG. 19. In such an embodiment, operating system 1930 can comprise one virtual machine (VM) of multiple VMs hosted at computer 1902. Furthermore, operating system 1930 can provide runtime environments, such as the Java runtime environment or the .NET framework, for application programs 1932. Runtime environments are consistent execution environments that allow application programs 1932 to run on any operating system that includes the runtime environment. Similarly, operating system 1930 can support containers, and application programs 1932 can be in the form of containers, which are lightweight, standalone, executable packages of software that include, e.g., code, runtime, system tools, system libraries and settings for an application.

Further, computer 1902 can be enable with a security module, such as a trusted processing module (TPM). For instance with a TPM, boot components hash next in time boot components, and wait for a match of results to secured values, before loading a next boot component. This process can take place at any layer in the code execution stack of computer 1902, e.g., applied at the application execution level or at the operating system (OS) kernel level, thereby enabling security at any level of code execution.

A user can enter commands and information into the computer 1902 through one or more wired/wireless input devices, e.g., a keyboard 1938, a touch screen 1940, and a pointing device, such as a mouse 1942. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1904 through an input device interface 1944 that can be coupled to the system bus 1908, but can be connected by other interfaces, such as a parallel port, an IEEE 1394 serial port, a game port, a USB port, an IR interface, a BLUETOOTH® interface, etc.

A monitor 1944 or other type of display device can be also connected to the system bus 1908 via an interface, such as a video adapter 1946. In addition to the monitor 1944, a computer typically includes other peripheral output devices (not shown), such as speakers, printers, etc.

The computer 1902 can operate in a networked environment using logical connections via wired and/or wireless communications to one or more remote computers, such as a remote computer(s) 1948. The remote computer(s) 1948 can be a workstation, a server computer, a router, a personal computer, portable computer, microprocessor-based entertainment appliance, a peer device or other common network node, and typically includes many or all of the elements described relative to the computer 1902, although, for purposes of brevity, only a memory/storage device 1950 is illustrated. The logical connections depicted include wired/wireless connectivity to a local area network (LAN) 1952 and/or larger networks, e.g., a wide area network (WAN) 1954. Such LAN and WAN networking environments are commonplace in offices and companies, and facilitate enterprise-wide computer networks, such as intranets, all of which can connect to a global communications network, e.g., the Internet.

When used in a LAN networking environment, the computer 1902 can be connected to the local network 1952 through a wired and/or wireless communication network interface or adapter 1956. The adapter 1956 can facilitate wired or wireless communication to the LAN 1952, which can also include a wireless access point (AP) disposed thereon for communicating with the adapter 1956 in a wireless mode.

When used in a WAN networking environment, the computer 1902 can include a modem 1958 or can be connected to a communications server on the WAN 1954 via other means for establishing communications over the WAN 1954, such as by way of the Internet. The modem 1958, which can be internal or external and a wired or wireless device, can be connected to the system bus 1908 via the input device interface 1942. In a networked environment, program modules depicted relative to the computer 1902 or portions thereof, can be stored in the remote memory/storage device 1950. It will be appreciated that the network connections shown are example and other means of establishing a communications link between the computers can be used.

When used in either a LAN or WAN networking environment, the computer 1902 can access cloud storage systems or other network-based storage systems in addition to, or in place of, external storage devices 1916 as described above. Generally, a connection between the computer 1902 and a cloud storage system can be established over a LAN 1952 or WAN 1954 e.g., by the adapter 1956 or modem 1958, respectively. Upon connecting the computer 1902 to an associated cloud storage system, the external storage interface 1926 can, with the aid of the adapter 1956 and/or modem 1958, manage storage provided by the cloud storage system as it would other types of external storage. For instance, the external storage interface 1926 can be configured to provide access to cloud storage sources as if those sources were physically connected to the computer 1902.

The computer 1902 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

FIG. 20 is a schematic block diagram of a sample computing environment 2000 with which the disclosed subject matter can interact. The sample computing environment 2000 includes one or more client(s) 2002. The client(s) 2002 can be hardware and/or software (e.g., threads, processes, computing devices). The sample computing environment 200 also includes one or more server(s) 2004. The server(s) 2004 can also be hardware and/or software (e.g., threads, processes, computing devices). The servers 2004 can house threads to perform transformations by employing one or more embodiments as described herein, for example. One possible communication between a client 2002 and servers 2004 can be in the form of a data packet adapted to be transmitted between two or more computer processes. The sample computing environment 2000 includes a communication framework 2006 that can be employed to facilitate communications between the client(s) 2002 and the server(s) 2004. The client(s) 2002 are operably connected to one or more client data store(s) 2008 that can be employed to store information local to the client(s) 2002. Similarly, the server(s) 2004 are operably connected to one or more server data store(s) 2010 that can be employed to store information local to the servers 2004.

What has been described above includes examples of the subject innovation. It is, of course, not possible to describe every conceivable combination of components or methodologies for purposes of describing the disclosed subject matter, but one of ordinary skill in the art may recognize that many further combinations and permutations of the subject innovation are possible. Accordingly, the disclosed subject matter is intended to embrace all such alterations, modifications, and variations that fall within the spirit and scope of the appended claims.

In particular and in regard to the various functions performed by the above described components, devices, circuits, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects of the disclosed subject matter. In this regard, it will also be recognized that the disclosed subject matter includes a system as well as a computer-readable medium having computer-executable instructions for performing the acts and/or events of the various methods of the disclosed subject matter.

In addition, while a particular feature of the disclosed subject matter may have been disclosed with respect to only one of several implementations, such feature may be combined with one or more other features of the other implementations as may be desired and advantageous for any given or particular application. Furthermore, to the extent that the terms "includes," and "including" and variants thereof are used in either the detailed description or the claims, these terms are intended to be inclusive in a manner similar to the term "comprising."

In this application, the word "exemplary" is used to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion.

Various aspects or features described herein may be implemented as a method, apparatus, or article of manufacture using standard programming and/or engineering techniques. The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips . . . ), optical disks [e.g., compact disk (CD), digital versatile disk (DVD) . . . ], smart cards, and flash memory devices (e.g., card, stick, key drive . . . ).

What is claimed is:

1. A system, comprising:
   a memory that stores executable components; and
   a processor, operatively coupled to the memory, that executes the executable components, the executable components comprising:
   a user interface component configured to
      render an interface display and to receive, via interaction with the interface display, pipeline configuration input that defines aspects of a data pipeline, wherein the interface display comprises a component selection section that renders a library of pipeline components as selectable object icons, and a pipeline builder section that renders pipeline components selected from the component selection section by the pipeline configuration input, and
      in response to receiving, via interaction with the interface display, selection of a pipeline component of the pipeline components rendered in the pipeline builder section, render attributes of the pipeline component in an object configuration section of the interface display, and
      receive, as a portion of the pipeline configuration input, values of one or more of the attributes of the pipeline component via interaction with the component configuration section; and a pipeline configuration component configured to generate a pipeline application based on the pipeline configuration input, the pipeline application configured to execute on a hardware platform to implement the data pipeline, wherein the pipeline components comprise at least a data preparation component, and inclusion of the data preparation component in the pipeline application configures the data pipeline to perform data preparation processing specified by the data preparation component on input data obtained by the data pipeline from a data source.

2. The system of claim 1, wherein the pipeline configuration input comprises data source selection input that selects a data source component, from the library of pipeline components, for inclusion in the pipeline application, the data source component specifying the data source from which the data pipeline is to obtain the data.

3. The system of claim 1, wherein the inclusion of the data preparation component in the pipeline application configures the data pipeline to convert the input data to transformed data having a format that is understandable by downstream processing components of the data pipeline.

4. The system of claim 3, wherein the format of the transformed data is a comma-separated values (CSV) file.

5. The system of claim 3, wherein the inclusion of the data preparation component in the pipeline application configures the data pipeline to convert the input data to the transformed data based on a learned schema of the input data.

6. The system of claim 1, wherein the pipeline configuration component is configured to generate the pipeline application based on an arrangement of the pipeline components rendered in the pipeline builder section.

7. The system of claim 1, wherein the library of pipeline components comprise at least data source components configured to link the data pipeline to respective different types of data sources, data processing components configured to apply respective types of data processing on the input data, and data emitter components configured to publish selected sets of the input data from the pipeline to respective different types of data sink entities.

8. The system of claim 1, further comprising a pipeline deployment component configured to deploy the pipeline application to the hardware platform.

9. The system of claim 1, wherein the pipeline configuration input further comprises at least model selection input that selects an analytic model for inclusion in the pipeline application, and inclusion of the analytic model in the pipeline application configures the data pipeline to apply the analytic model to at least a subset of the input data mapped to the analytic model.

10. A method, comprising:

rendering, by a system comprising a processor, an interface display on a client device, wherein the rendering comprises rendering a component selection section that renders selectable icons representing pipeline components available for inclusion in a data pipeline application, and rendering a pipeline builder section that renders a subset of the pipeline components selected from the component selection section;

receiving, by the system via interaction with the interface display, pipeline configuration input that defines aspects of a data pipeline, wherein the receiving comprises receiving selection input that selects the subset of the pipeline components from the component selection section for inclusion in the data pipeline application, the subset of the pipeline components comprising at least a data preparation component, in response to receiving, via interaction with the pipeline builder section, selection of a pipeline component of the subset of the pipeline components, rendering attributes of the pipeline component in a component configuration section of the interface display, and receiving, via interaction with the component configuration section, values of one or more of the attributes of the pipeline component; and generating, by the system, the data pipeline application in accordance with the pipeline configuration input, wherein the generating comprises, in response to selection of the data preparation component for inclusion in the data pipeline application, configuring the data pipeline application to perform data preparation processing specified by the data preparation component on input data obtained by the data pipeline, and the data pipeline application is configured to execute on a hardware device to implement the data pipeline.

11. The method of claim 10, wherein the receiving of the pipeline configuration input further comprises receiving data source selection input that selects a data source component, of the pipeline components, for inclusion in the data pipeline application, and the method further comprises, in response to the receiving of the data source selection input, configuring, by the system, the data pipeline application to obtain the input data from a data source specified by the data source component.

12. The method of claim 11, wherein the configuring of the data pipeline application to perform the data preparation processing comprises configuring the data pipeline application to convert the input data to transformed data having a format that is understandable by processing components of the data pipeline.

13. The method of claim 12, wherein the format of the transformed data is a comma-separated values (CSV) file.

14. The method of claim 12, wherein the configuring of the data pipeline application to convert the data comprises configuring the data pipeline application to learn a schema of the input data from the data source and to convert the input data to the transformed data based on the schema.

15. The method of claim 10, wherein the generating of the data pipeline application comprises generating the data pipeline application based on an arrangement of the pipeline components rendered in the pipeline builder section.

16. The method of claim 10, wherein the receiving of the pipeline configuration input comprises receiving at least model selection input that selects an analytic or machine learning model for inclusion in the data pipeline application, and the generating comprises, in response to the receiving of the model selection input, configuring the data pipeline application to apply the analytic or machine learning model to a subset of the input data mapped to the analytic or machine learning model.

17. A non-transitory computer-readable medium having stored thereon instructions that, in response to execution, cause a system comprising a processor to perform operations, the operations comprising:

rendering an interface display on a client device, wherein the rendering comprises displaying a component selection section that displays selectable component icons representing pipeline components available for inclusion in a data pipeline application, and displaying a pipeline builder section that displays a subset of the pipeline components selected from the component selection section for inclusion in the data pipeline application;

receiving, via interaction with the interface display, pipeline configuration input that defines aspects of a data pipeline, wherein the receiving comprises receiving selection input that selects the subset of the pipeline components for inclusion in the data pipeline application, wherein the subset of the pipeline components comprises at least a data preparation component, in response to receiving, via interaction with the interface display, selection of a pipeline component of the subset of the pipeline components rendered in the pipeline builder section, displaying attributes of the pipeline component in a component configuration section of the interface display, and receiving, via interaction with the component configuration section, values of one or more of the attributes of the pipeline component; and generating the data pipeline application based on the pipeline configuration input, wherein the generating comprises, in response to selection of the data preparation component for inclusion in the data preparation application, configuring the data pipeline application to perform data preparation processing specified by the data preparation component on input data obtained by the data pipeline, and the data pipeline application is configured to execute on a hardware platform to implement the data pipeline.

18. The non-transitory computer-readable medium of claim 17, wherein the receiving of the pipeline configuration input further comprises receiving data source selection input that selects a data source component, of the pipeline component, for inclusion in the data pipeline application, and the operations further comprise, in response to the receiving of the data source selection input, configuring the data pipeline application to obtain the input data from a data source specified by the data source component.

19. The non-transitory computer-readable medium of claim 17, wherein the configuring of the data pipeline application to perform the data preparation processing comprises configuring the data pipeline application to convert the input data to transformed data having a format that is understandable by processing components of the data pipeline.

20. The non-transitory computer-readable medium of claim 17, wherein the generating of the data pipeline application comprises generating the data pipeline application based on an arrangement of the pipeline components rendered in the pipeline builder section.

* * * * *